(12) United States Patent
McBride et al.

(10) Patent No.: US 11,493,281 B1
(45) Date of Patent: Nov. 8, 2022

(54) FLOATING SEPARATOR PISTON FOR A THERMAL ENERGY STORAGE SYSTEM

(71) Applicant: Norwich Technologies, Inc., White River Junction, VT (US)

(72) Inventors: Troy McBride, Norwich, VT (US); Jonathan Lynch, St. Johnsbury, VT (US); Joel Stettenheim, Norwich, VT (US); Oliver James Brambles, Wesham (GB); Leif Kilkenny Johnson, West Lebanon, NH (US); Per Erik Kristoffer Edstrom, Stockbridge, VT (US)

(73) Assignee: Norwich Technologies, Inc., White River Junction, VT (US)

( * ) Notice: Subject to any disclaimer, the term of this patent is extended or adjusted under 35 U.S.C. 154(b) by 0 days.

(21) Appl. No.: 17/550,137

(22) Filed: Dec. 14, 2021

(51) Int. Cl.
F28D 20/00 (2006.01)
(52) U.S. Cl.
CPC .. F28D 20/0034 (2013.01); *F28D 2020/0095* (2013.01)
(58) Field of Classification Search
CPC ......... F28D 20/0034; F28D 2020/0086; F28D 2020/0095; F16J 15/002; F16J 15/56
See application file for complete search history.

(56) References Cited

U.S. PATENT DOCUMENTS

| | | | |
|---|---|---|---|
| 2,180,795 A * | 11/1939 | Christensen | F16J 15/56 285/302 |
| 2,486,833 A * | 11/1949 | Freund | F28D 20/0039 62/235.1 |
| 2,802,709 A | 8/1957 | Heinze | |
| 4,501,262 A | 2/1985 | Lyon | |
| 4,523,629 A | 6/1985 | Copeland | |
| 4,570,945 A | 2/1986 | Hayashi | |
| 4,986,168 A | 1/1991 | Geffroy et al. | |
| 7,958,731 B2 | 6/2011 | McBride et al. | |
| 8,978,642 B2 | 3/2015 | Stettenheim et al. | |
| 9,297,554 B2 | 3/2016 | Stettenheim et al. | |
| 9,404,675 B2 | 8/2016 | Stettenheim et al. | |
| 10,378,830 B2 | 8/2019 | Schierack et al. | |
| 2005/0167092 A1 | 8/2005 | Comeaux et al. | |

(Continued)

FOREIGN PATENT DOCUMENTS

| | | | | |
|---|---|---|---|---|
| CN | 108915972 A | | 11/2018 | |
| DE | 4237629 A1 | * | 5/1993 | ............ F15B 15/082 |

(Continued)

OTHER PUBLICATIONS

Norwich Technologies, Inc., U.S. Patent Application Titled Thermal Energy Storage System with Parallel Connected Vessels, U.S. Appl. No. 17/550,124, filed Dec. 14, 2021, 66 pages.

(Continued)

*Primary Examiner* — Eric S Ruppert
(74) *Attorney, Agent, or Firm* — Sunstein LLP

(57) ABSTRACT

A floating piston configured to be disposed in a vessel of a thermal energy storage system to separate a hot working fluid from a cold working fluid. The floating piston includes a piston body having a first end, a second end, and a central region. There is a compressible member which is disposed in the central region of the piston and which is configured to engage with an inner surface of the vessel when the piston is disposed in the vessel.

27 Claims, 21 Drawing Sheets

(56) References Cited

U.S. PATENT DOCUMENTS

| | | |
|---|---|---|
| 2005/0218240 A1 | 10/2005 | Sienel |
| 2009/0179386 A1 | 7/2009 | Lindner-Silwester et al. |
| 2011/0100010 A1 | 5/2011 | Freund et al. |
| 2012/0067047 A1 | 3/2012 | Peterson et al. |
| 2012/0067300 A1 | 3/2012 | Berrio |
| 2013/0147124 A1 | 6/2013 | Yang |
| 2014/0260376 A1 | 9/2014 | Kopko et al. |
| 2017/0002928 A1 | 1/2017 | Feistel |
| 2017/0234626 A1 | 8/2017 | Schierack et al. |
| 2019/0203990 A1 | 7/2019 | Burk |
| 2020/0096106 A1 * | 3/2020 | Feistel .................... F16J 15/28 |

FOREIGN PATENT DOCUMENTS

| | | |
|---|---|---|
| DE | 10358548 A1 | 8/2004 |
| DE | 10 2007 034 418 A1 | 1/2009 |
| DE | 10 2010 034 294 A1 | 2/2012 |
| GB | 864251 | 3/1961 |
| WO | WO-2018033245 A1 * | 2/2018 |

OTHER PUBLICATIONS

Norwich Technologies, Inc., U.S. Patent Application Titled "Thermal Energy Storage System," U.S. Appl. No. 17/550,144, filed Dec. 14, 2021, 66 pages.

Norwich Technologies, Inc., U.S. Patent Application Titled "Piston Ring for Floating Piston in a Thermal Energy Storage System," U.S. Appl. No. 17/550,152, filed Dec. 14, 2021, 59 pages.

United States Patent and Trademark Office, Office Action, U.S. Appl. No. 17/550,124, dated Jun. 9, 2022, 23 pages.

\* cited by examiner

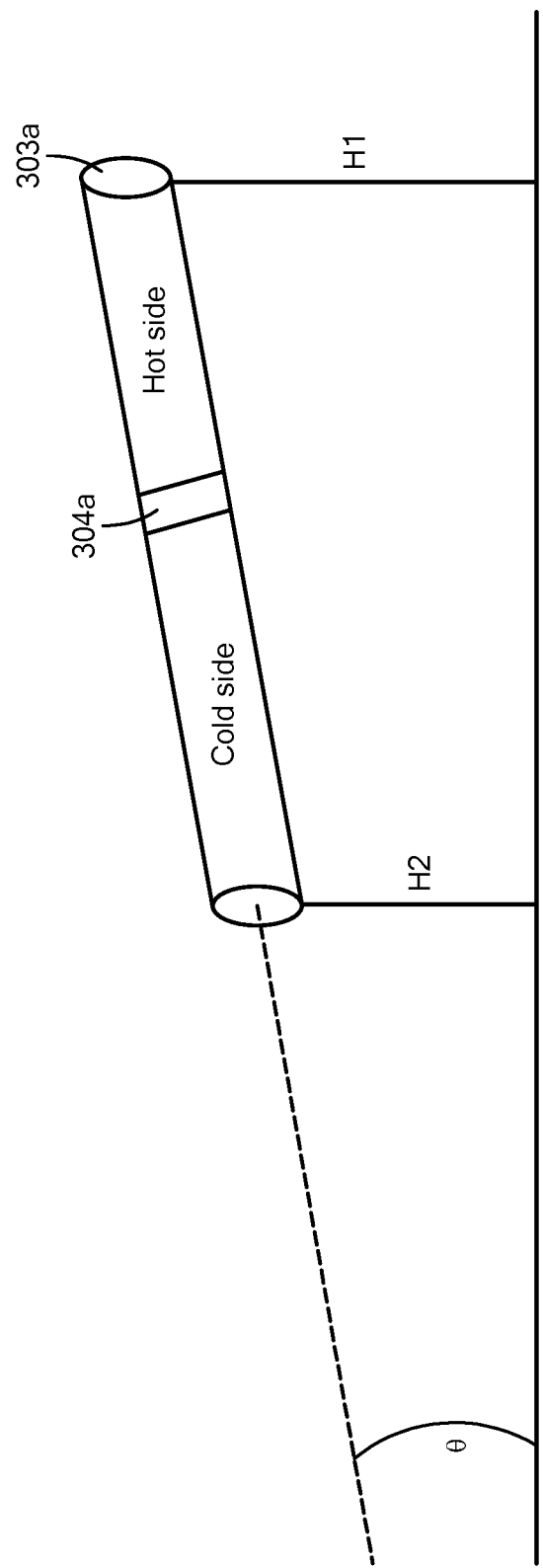

Ferrofluid Piston
- Magnetic core surrounded by ferrofluid
- Ferrofluid acts as seperator between hot and cold side

FLOATING SEPARATOR PISTON FOR A THERMAL ENERGY STORAGE SYSTEM

TECHNICAL FIELD

The present invention relates to a floating piston for a thermal energy storage systems, and more particularly to such a floating separator piston which is disposed in a vessel of the thermal energy storage system to separate the cold and hot sides of a working fluid in the vessel.

BACKGROUND ART

Research and development of large-scale renewable energy storage has been rapidly growing with an increasing global demand for more energy from sources that reduce the output of greenhouse gas emissions. A significant limitation of renewable energy sources, such as wind and solar, are their dependence on the weather and, in the case of solar, sunlight. Another drawback is their inability to store and deliver/dispatch power when required. While several forms of energy storage are currently commercially available, new long-term and short-term storage concepts are continually being developed and improved upon to decrease capital costs and increase energy conversion efficiencies.

Thermal energy storage (TES) is one form of energy storage that may be used in conjunction with renewable energy sources. TES allows excess thermal energy to be stored and used at varying scales ranging from individual homes and buildings to electric grid scale energy storage that may produce megawatts of power. The thermal energy for storage may include, for example, heat produced with heat pumps from off-peak, lower cost electric power, a practice called peak shaving; heat from combined heat and power (CHP) power plants; heat produced by renewable electrical energy; and waste heat from industrial processes.

One promising source of heat that may be used in conjunction with TES is a concentrating solar power (CSP) system, which uses reflective surfaces to concentrate sunlight onto a small area, where it is absorbed and converted to heat. Concentrators can increase the power flux of sunlight hundreds of times and can be used to heat a fluid such as water. The heated water may be stored and later used to generate steam to spin a turbine for electricity production. The heated water may also be used as a heating source.

There are drawbacks for TES systems, as they typically have high initial costs for material and installation and a long ROI. In addition, they require a lot of space, are not yet highly efficient, and are not scalable. Therefore, there exists a need for a TES system with a reduced cost and footprint, but with increased efficiency and with the ability to be easily scaled.

SUMMARY OF THE EMBODIMENTS

In accordance with one embodiment of the disclosure, there is a floating piston configured to be disposed in a vessel of a thermal energy storage system to separate a hot working fluid from a cold working fluid. The floating piston includes a piston body having a first end, a second end, and a central region. There is a compressible member which is disposed in the central region of the piston and which is configured to engage with an inner surface of the vessel when the piston is disposed in the vessel.

In certain embodiments, one or more of the following features may be included. The piston body may be cylindrical in shape and it may include an outer surface having a first recess formed therein about a circumference of the piston body. The first recess may be formed in the central region and extends along a portion of a length of the piston body. The compressible member may be disposed in the first recess and it may extend along a length of the first recess and about the circumference of the piston body. The length of the first recess may be 50% to 90% of the length of the piston body. The compressible member may be compressible to a thickness of between 25-75% of its original thickness. The compressible member may include one or more of Kevlar, glass, a ferrofluid, or a metallic material. The compressible member may comprise a felt matrix material made of one or more of Kevlar, glass, or a metallic material. The compressible member may have a porosity level that results in a thermal loss due to leakage of the working fluid from the first end of the piston to the second end of the piston of no more than 5% of an overall thermal loss in a thermal energy storage system using the floating piston. The compressible member may engage with the inner surface of the vessel with an amount of friction that allows movement of the piston in the vessel with a pressure difference of not more than 10 psi between the first end of the piston to the second end of the piston. The inner surface of the vessel may have a variable roughness. The compressible member may include a support frame comprising one of a metal or a composite material. The outer diameter of the piston body may be at least 0.75 meters. The piston body may be symmetrical. The floating piston may have a neutral buoyancy state when disposed in the working fluid.

In other embodiments, one or more of the following features may be included. The piston body may include an internal chamber. The internal chamber may be evacuated to create a vacuum or it may include one or more of air, a nonreactive gas, a foamed glass or a metal. The internal chamber may include one or more of insulating materials, thermal breaks, and sealed chambers to decrease axial thermal conduction through the piston body. There may further be included a first piston ring disposed in a first circumferential slot located between the first end and the central region of the piston body and a second piston ring disposed in a second circumferential slot located between the second end and the central region of the piston body. There may additionally be included a third piston ring disposed in a third circumferential slot located between the first circumferential slot and the central region of the piston body and a fourth piston ring disposed in a fourth circumferential slot located between the second circumferential slot and the central region of the piston body. The first piston ring and the second piston ring each may have an outside diameter larger than an inside diameter of the vessel of the thermal energy storage system, and each may be compliant in a radial direction to provide a force against an inside surface of the vessel. The first piston ring, the second piston ring, the third piston ring, and forth piston ring each may have an outside diameter larger than an inside diameter of the vessel of the thermal energy storage system, and each may be compliant in a radial direction to provide a force against an inside surface of the vessel. At least one of the first piston ring and the second piston ring may be formed of a plurality of arc segments. The plurality of arc segments may be interconnected with an articulating joint. Each arc segment may be formed of one of a thermoplastic material, a metal, or a metal alloy. Each arc segment may be formed of one of a polyether ether ketone, polyether ketone, steel, stainless steel, Inconel, or a bronze alloy. Each arc segment may include a recess on an inner surface to receive a spring element. The spring element may be a wave spring. The spring element may be a single spring element spanning the circumference of the at least one first or second piston ring. The spring element may be comprised of a plurality of spring members one contained in the recess of each arc segment. There may further be included a first rider ring disposed in a first circumferential rider ring slot located between the first end and the first piston ring and a second rider ring disposed in a circumferential rider ring slot located between the second end and the second piston ring. The first rider ring and the second rider ring may comprise a Ni—Al-Bronze alloy. There may further be included a first set of rider pads disposed circumferentially about piston body between first end and the first piston ring and a second set of rider pads disposed circumferentially about the piston body between the second end and the second piston ring. The first set of rider pads and the second set of rider pads may comprise a Ni—Al-Bronze alloy.

In accordance another embodiment of the disclosure, there is a floating separator piston configured to be disposed in a vessel of a thermal energy storage system to separate a hot working fluid from a cold working fluid. The floating piston comprises a piston body having a first end, a second end, and a central region. There is a compressible member which is disposed in the central region of the piston and which is configured to engage with an inner surface of the vessel when the piston is disposed in the vessel. The compressible member extends along a length which is 50% to 90% of the length of the piston body.

In accordance with yet another embodiment of the disclosure, there is a floating separator piston configured to be disposed in a vessel of a thermal energy storage system to separate a hot working fluid from a cold working fluid. The floating piston includes a piston body having a first end, a second end, and a central region. There is a compressible member which is disposed in the central region of the piston and which is configured to engage with an inner surface of the vessel when the piston is disposed in the vessel. The compressible member is compressible to a thickness of between 25-75 percent of its original thickness.

In accordance with further embodiment of the disclosure, there is a floating separator piston configured to be disposed in a vessel of a thermal energy storage system to separate a hot working fluid from a cold working fluid. The floating separator piston includes a piston body having a first end, a second end, and a central region. There is a compressible member which is disposed in the central region of the piston and which is configured to engage with an inner surface of the vessel when the piston is disposed in the vessel. The compressible member has a porosity level that results in a thermal loss due to leakage of the working fluid from the first end of the piston to the second end of the piston of no more than 5% of an overall thermal loss in a thermal energy storage system using the floating piston. The compressible member engages with the inner surface of the vessel with an amount of friction that allows movement of the piston in the vessel with a pressure difference of not more than 10 psi between the first end of the piston to the second end of the piston.

BRIEF DESCRIPTION OF THE DRAWINGS

The foregoing features of embodiments will be more readily understood by reference to the following detailed description, taken with reference to the accompanying drawings, in which:

FIG. 3A shows use of an inclined pipe for the thermal storage system of FIG. 3 in accordance with an aspect of the present disclosure;

Figure 9A:
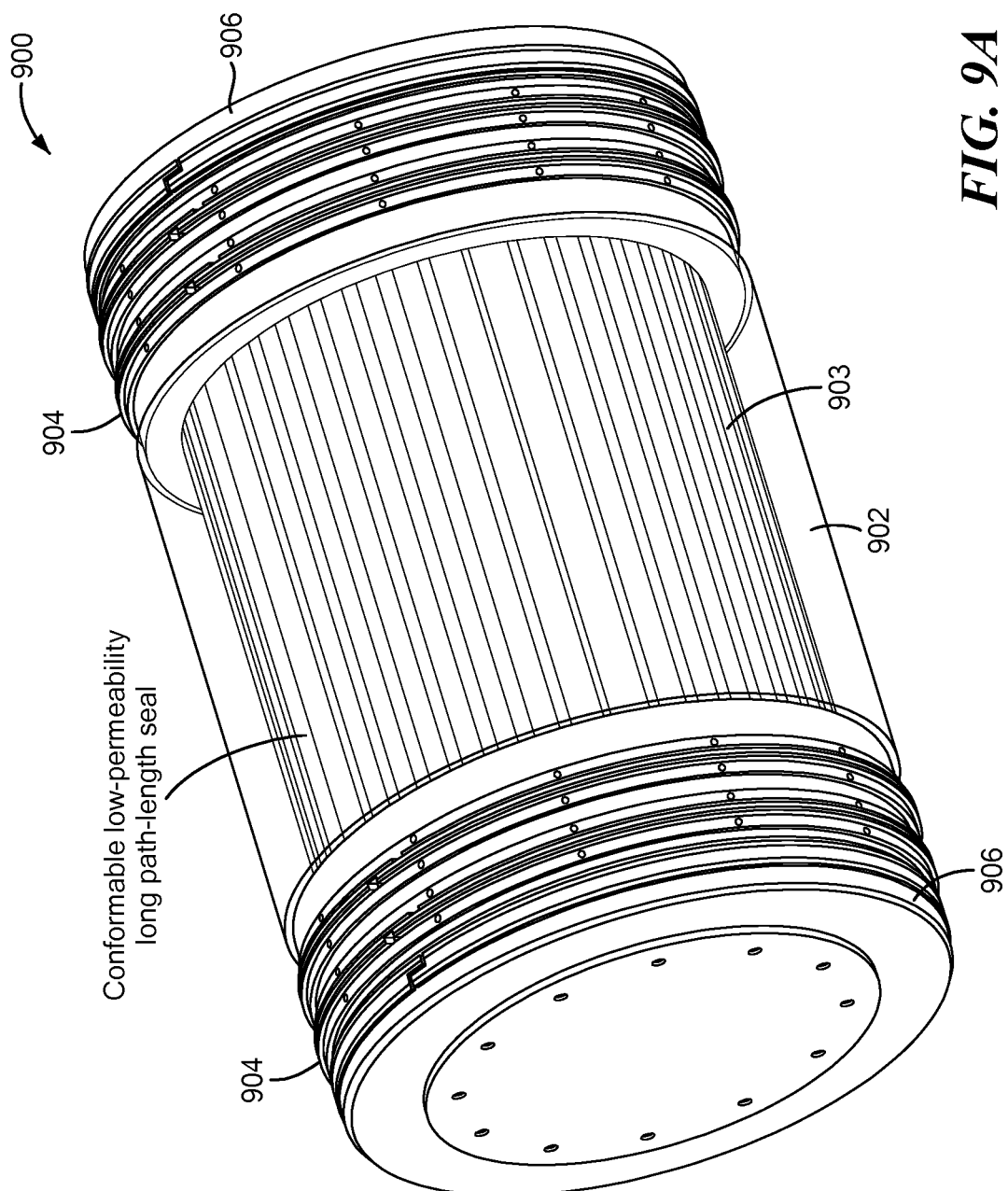
FIG. 9A shows an exemplary floating separator piston in accordance with embodiments of the present disclosure.
Figure 9B:
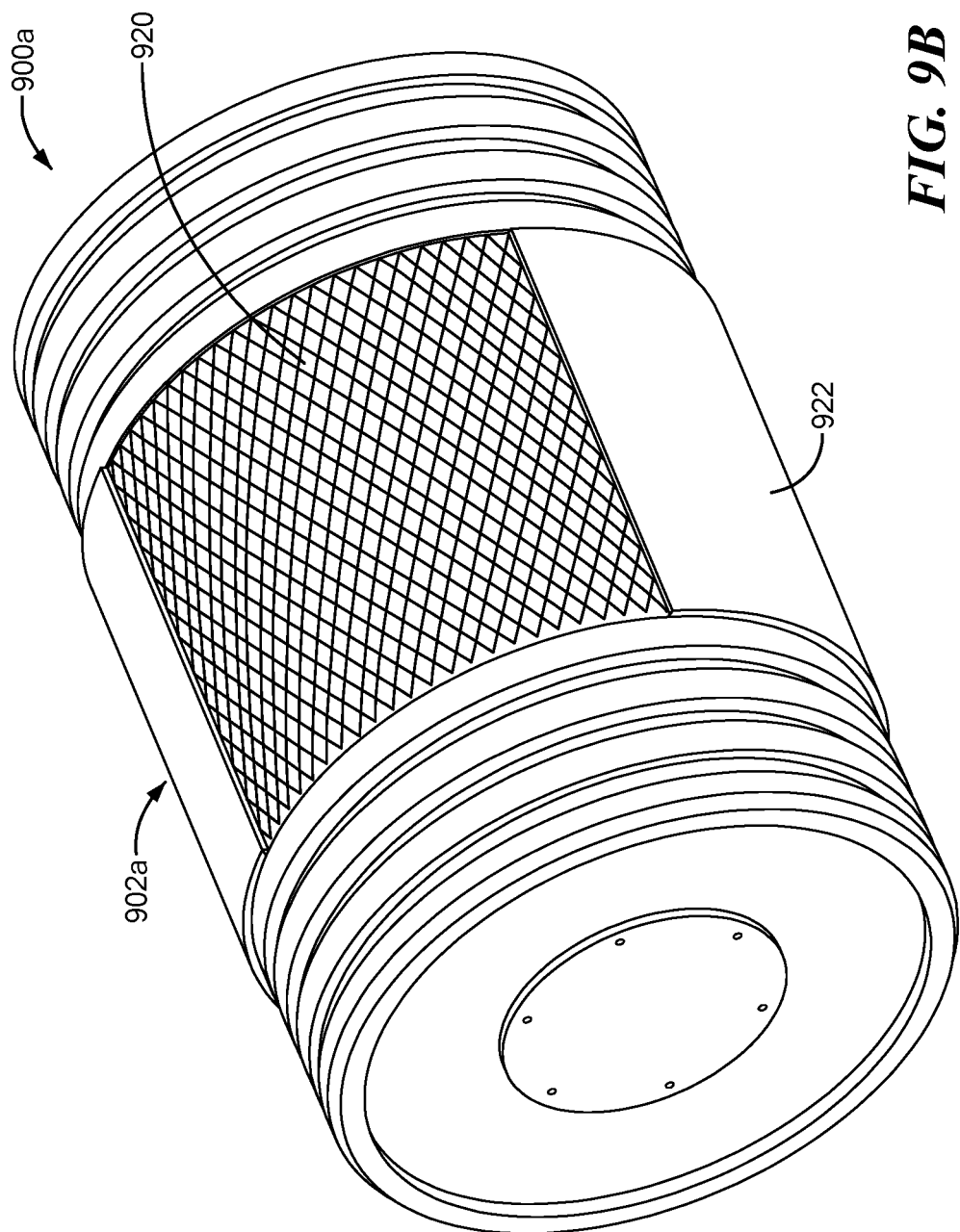
FIG. 9B shows an exemplary floating separator piston in accordance with another embodiments of the present disclosure, including a frame/armature for the compressible seal.
Figure 10:
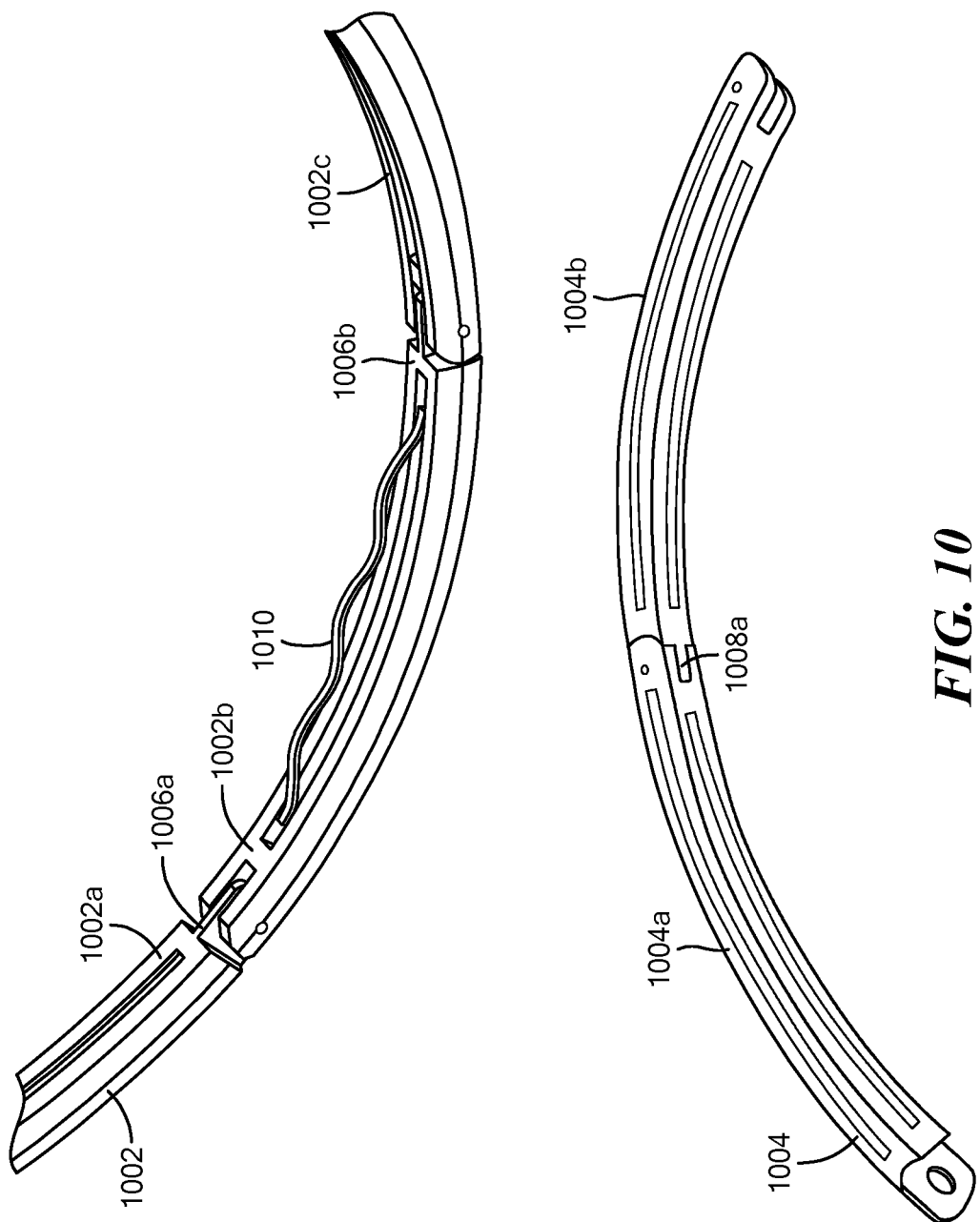
Figure 11:
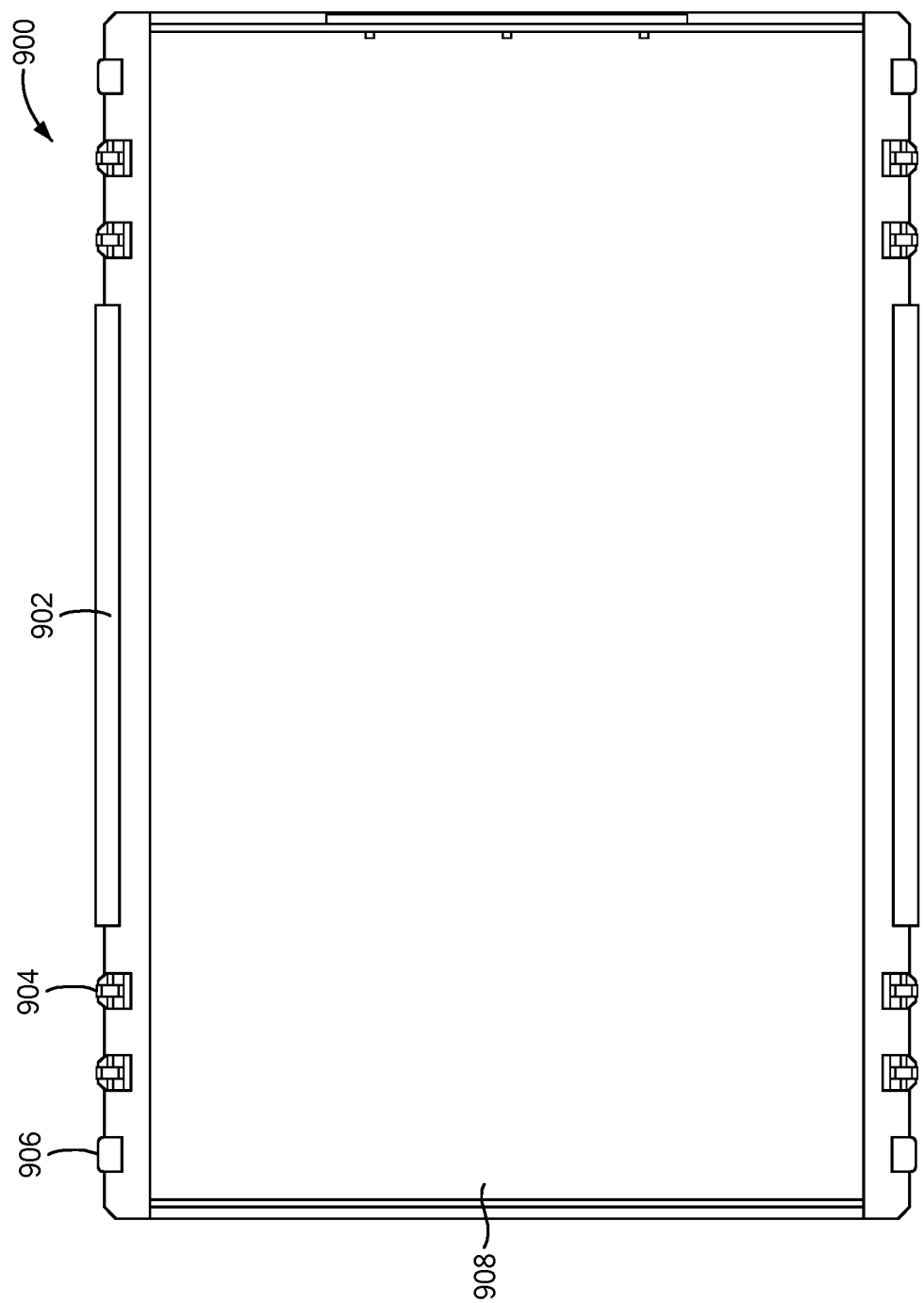
Figure 12:
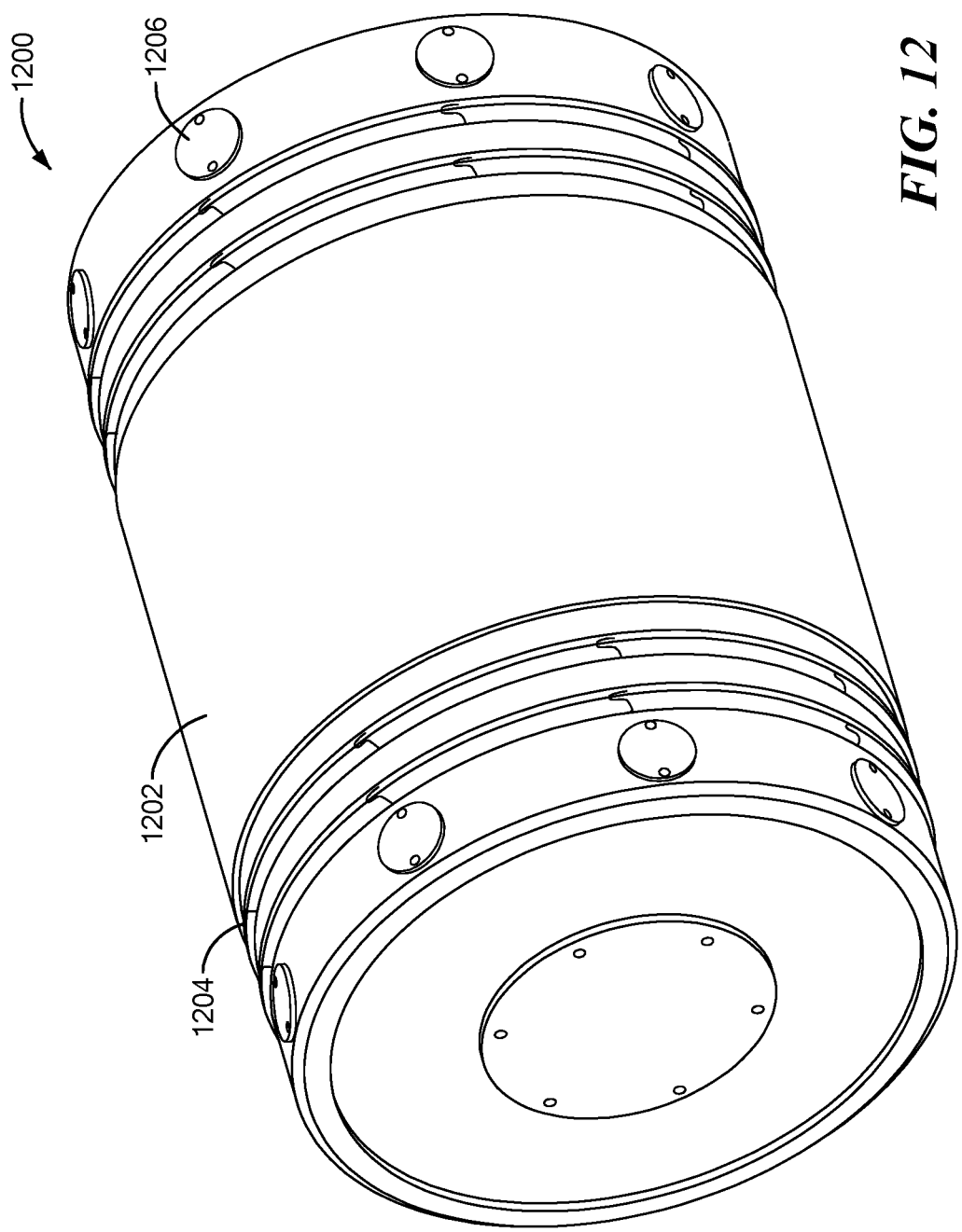
Figure 13:
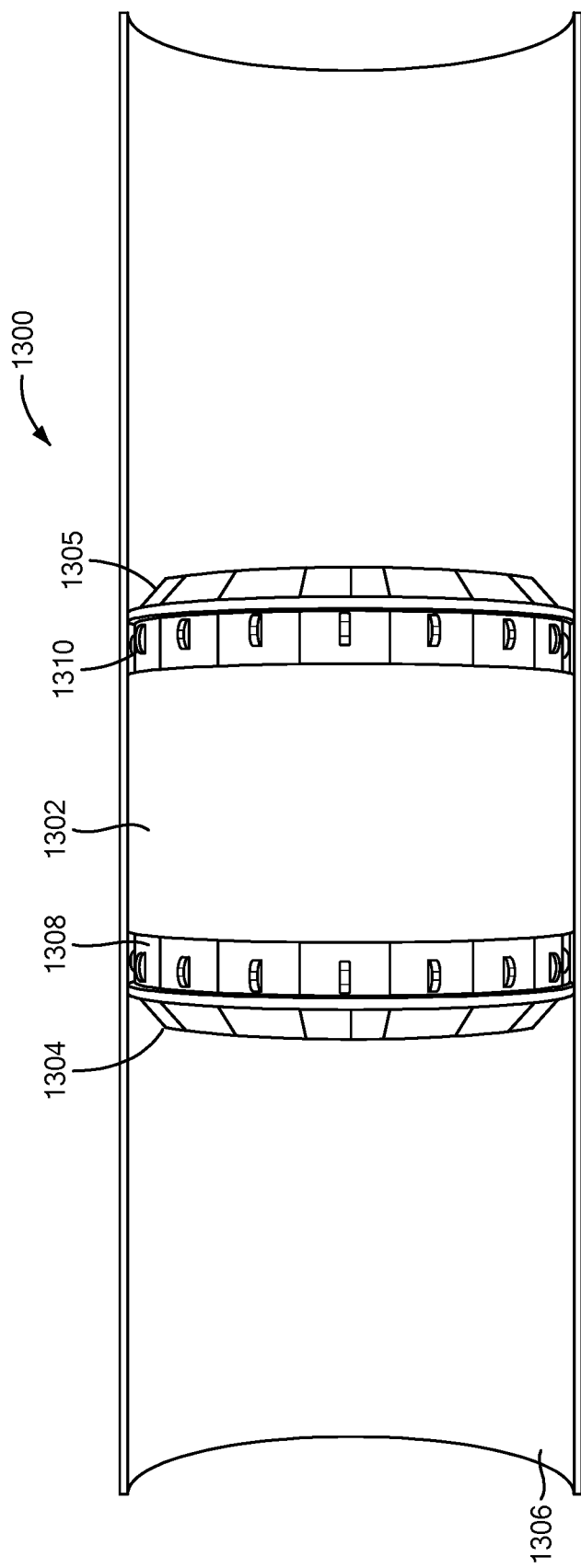
Figure 14:
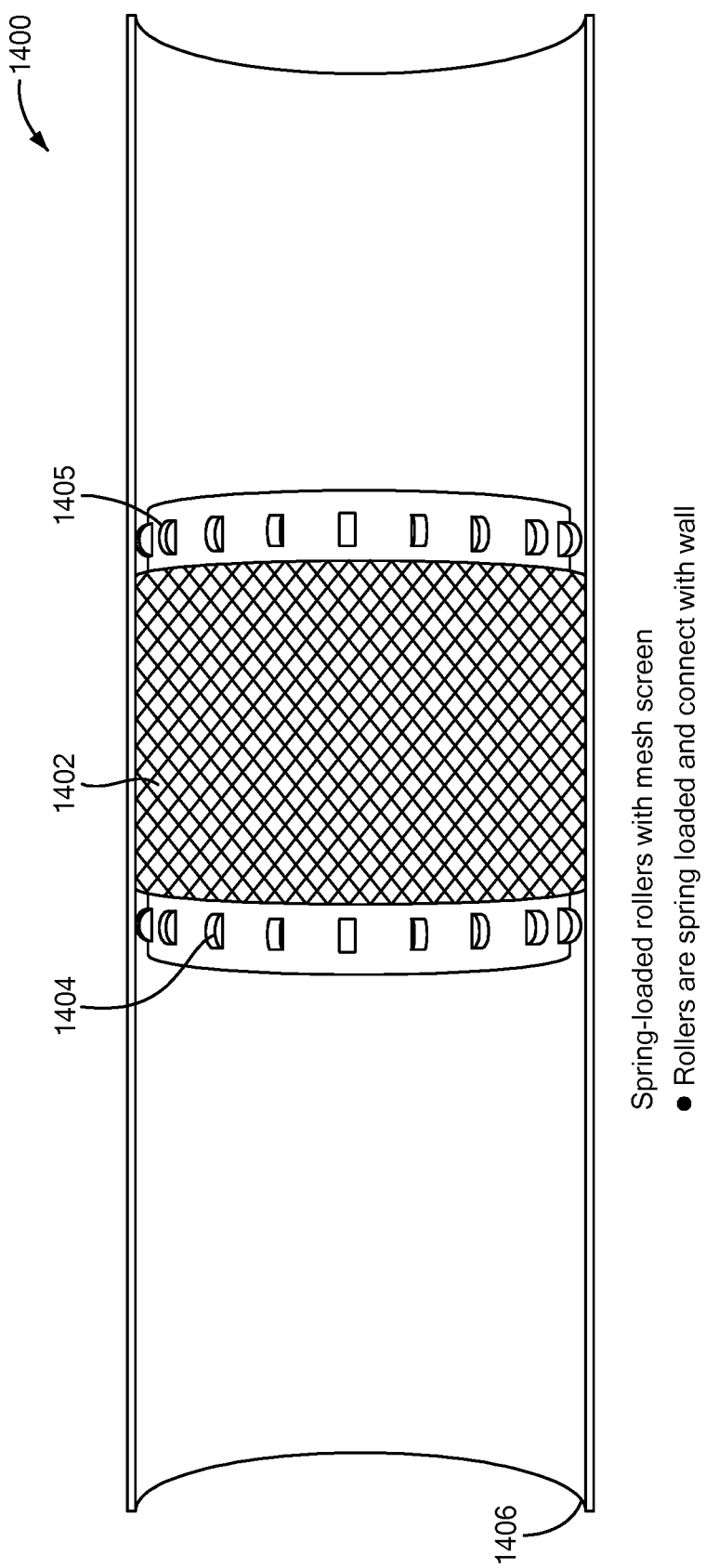
Figure 15:
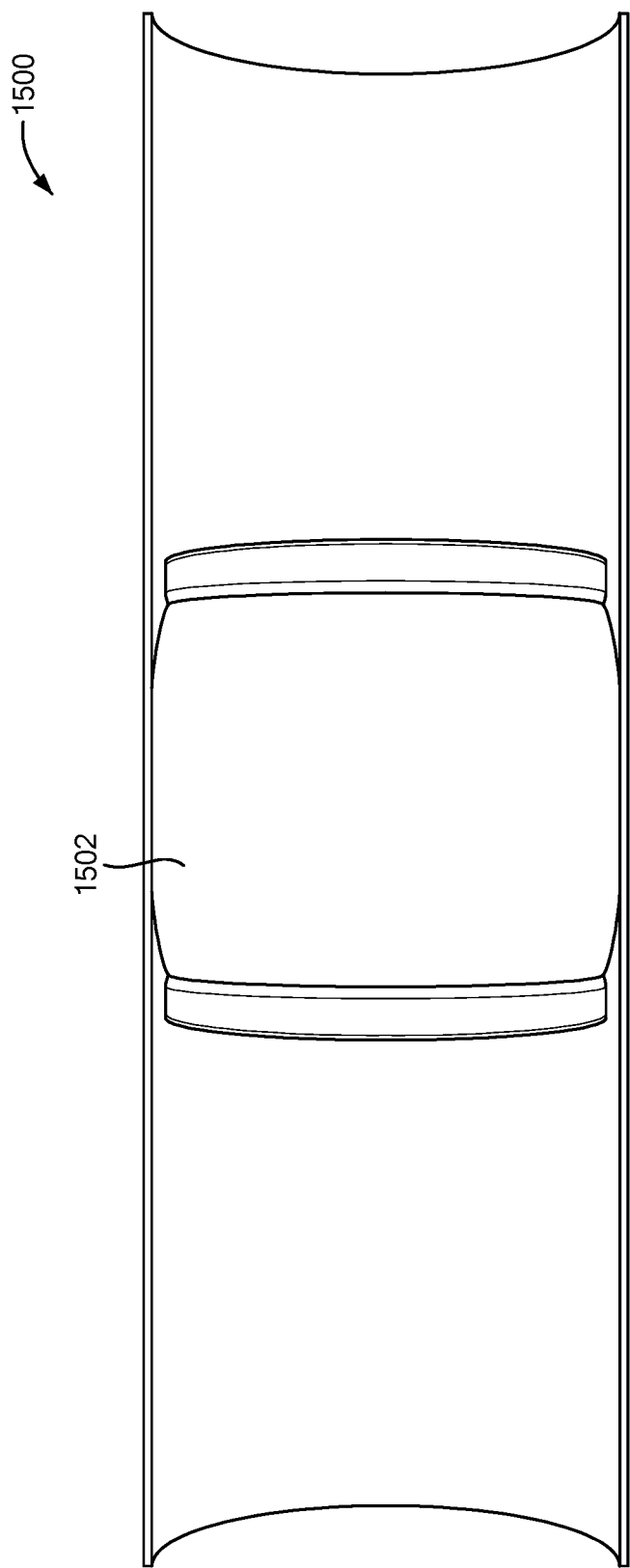
Figure 16:
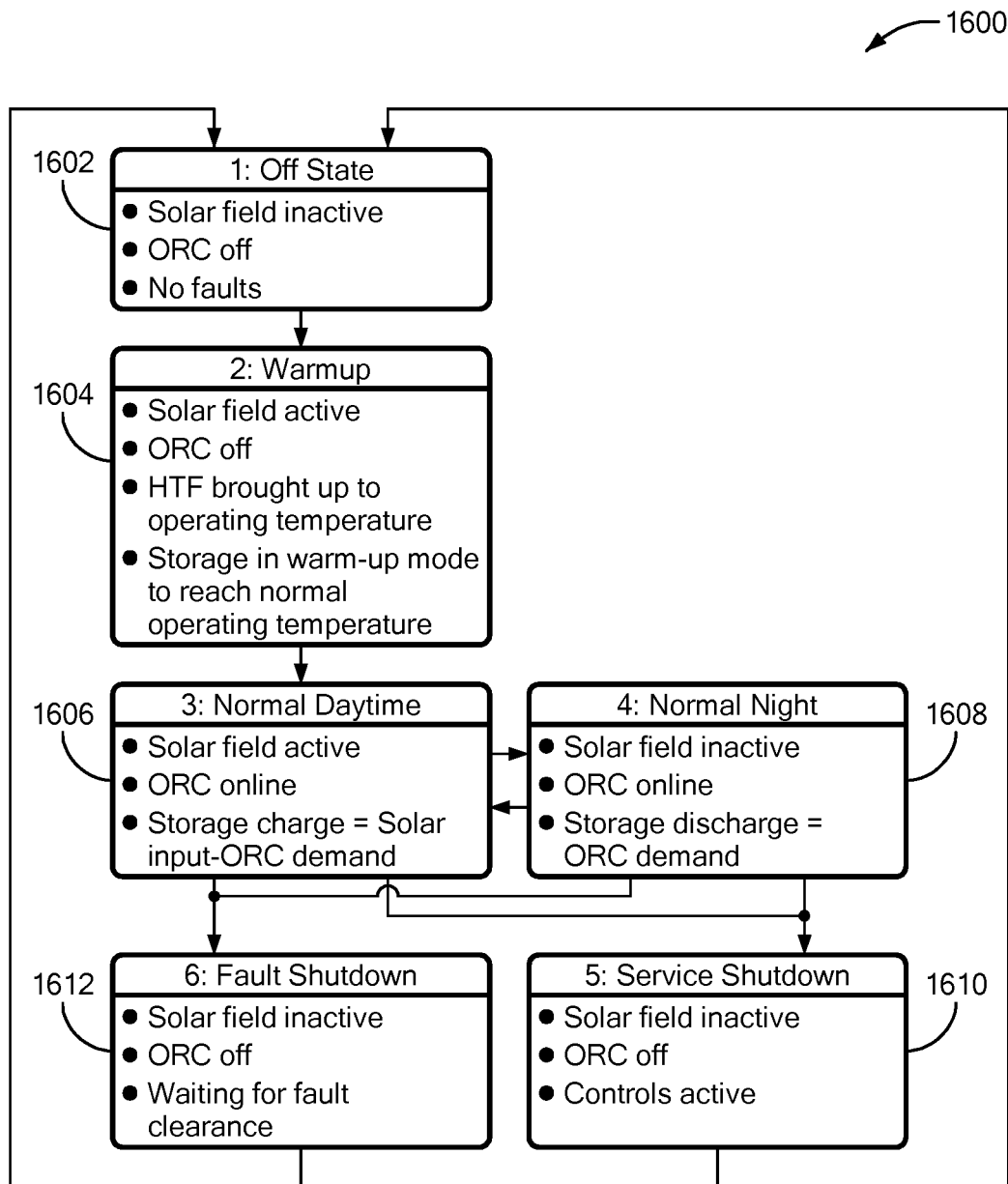
Figure 17:
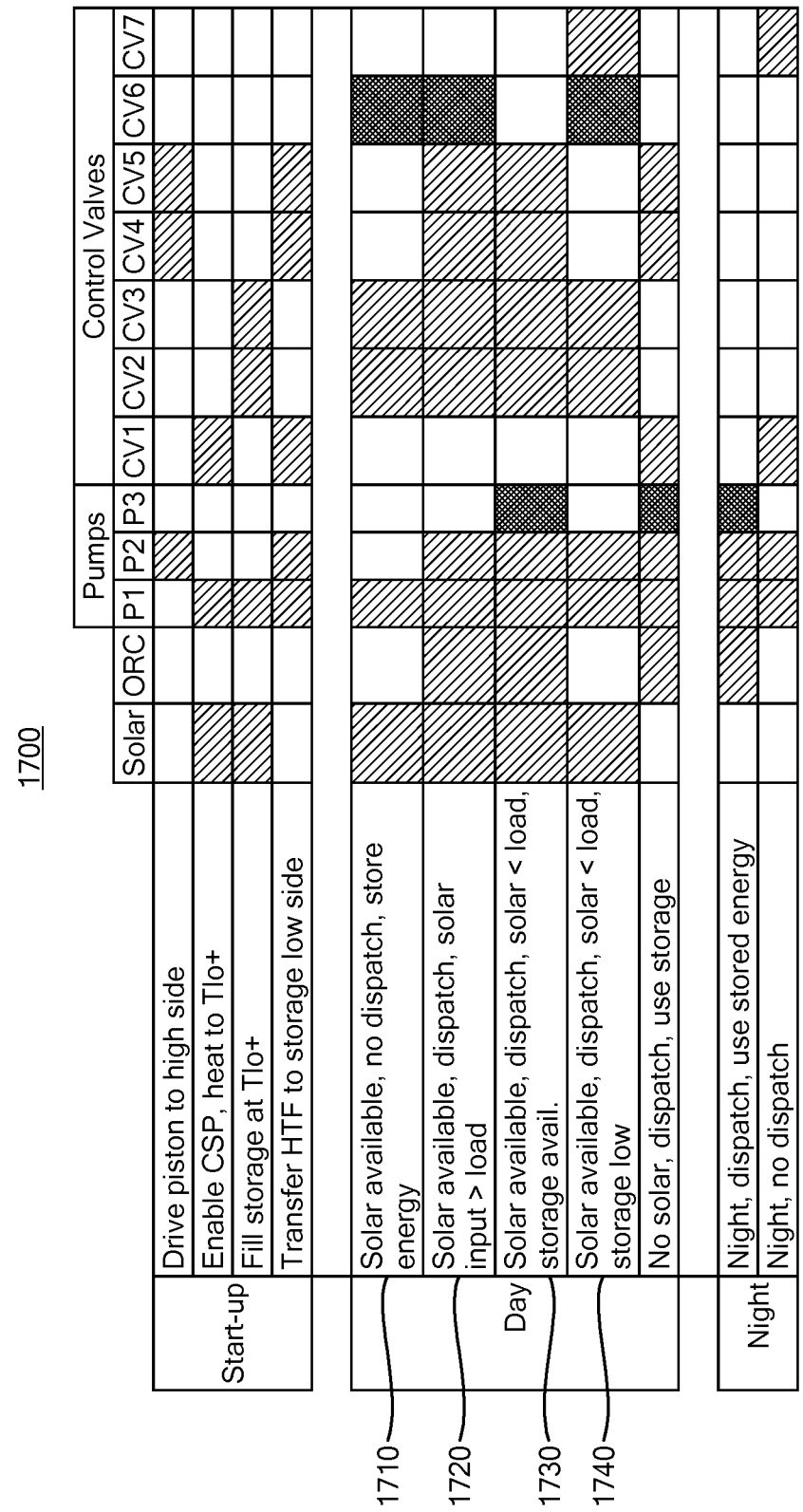
Figure 18:
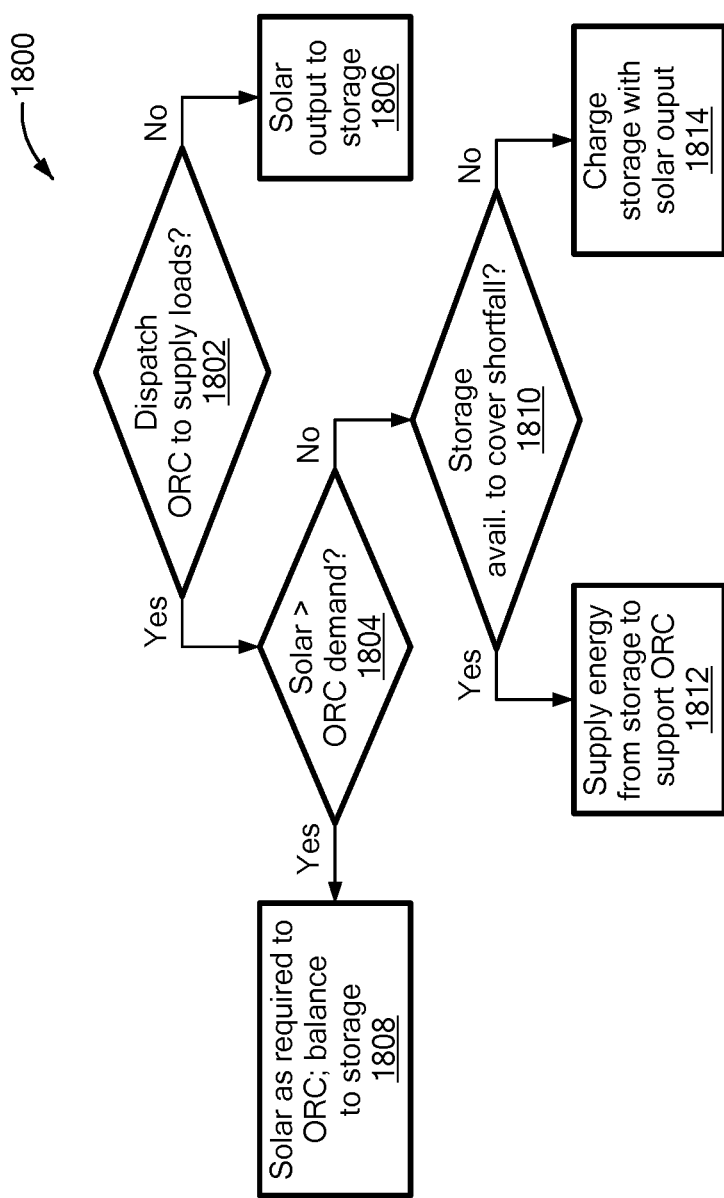

9C shows the body of the exemplary floating separator piston of FIG. 9B in cross-section;

FIG. 10 shows exemplary segmented piston rings in accordance with aspects of the present disclosure;

FIG. 11 shows a cross-sectional view of the exemplary floating separator piston of FIG. 9;

FIG. 12 shows an alternative floating separator piston in accordance with an aspect of the present disclosure;

FIG. 13 shows another alternative floating separator piston in accordance with an aspect of the present disclosure;

FIG. 14 shows yet another alternative floating separator piston in accordance with an aspect of the present disclosure;

FIG. 15 shows a further alternative floating separator piston in accordance with an aspect of the present disclosure;

FIG. 16 shows a state diagram for a control system in accordance with an aspect of the present disclosure;

FIG. 17 shows an example of pump and control valve actions for several system states in accordance with an embodiment of the present invention; and FIG. 18 shows an example of control system logic in accordance with an aspect of the present disclosure.

DETAILED DESCRIPTION OF SPECIFIC EMBODIMENTS

There is described herein a low cost, bulk thermal energy storage system having a plurality of horizontally disposed parallel connected vessels, each containing a floating separator piston to separate the vessels into hot and cold sides or sections of the working fluid, which may be water. The working fluid may be pressurized and maintained in the liquid phase. The working fluid in the storage system may be heated/charged by various types of heat sources and it may be used/discharged to drive various types of thermal loads.

The term "vessels" used herein includes various types of pipes, tubes, conduits, and the like and each of these terms may be used interchangeably. One exemplary form of pipe which is suitable for use with the thermal energy system described in this disclosure is natural gas pipeline. This is due to its ease of transport, its ability to store pressurized fluids, and its low cost and high reliability. However, the thermal energy storage system herein may be used with any other suitable vessel type.

The term "floating" as used herein with respect to the separator pistons disposed within vessels of the storage systems of this disclosure, means that the separator pistons do not have fixed mechanical connections to the interior of the vessels.

For purposes of simplifying the description of the thermal storage system herein, it is described in conjunction with a CSP generation system as the heat source and an ORC heat engine as the thermal load to produce electricity. Combining the CSP system and ORC heat engine with the thermal storage system of this disclosure, provides a low cost, long duration, fully dispatchable renewable energy generation system with the ability to support the connected customer's electrical demand during periods of little or no solar insolation. The inexpensive storage media described herein allows for economic long duration storage capacity, thus enabling a practical renewable based power system that can supply customer electrical loads around the clock.

It should be noted, however, that the thermal storage system described herein can be used to store energy from various types of heat sources, such as biomass, geothermal, heat recovery and work to energy systems. The stored heat may be used to operate various types of a thermal loads, including an ORC heat engine or other closed circuit gas turbines, a Stirling heat engine, steam turbine, or as a source of industrial process heat for a wide variety of applications.

Before describing specific embodiments and configurations of the thermal energy storage system of this disclosure, we provide descriptions of certain common aspects of the system. These include types of working fluids, operating temperatures and pressures, types and dimensions of pipes which may be used for storing the working fluid, thermal storage capacity, and certain functional aspects of the floating separator piston.

The thermal storage system herein may use long, insulated pipes (typically made of steel pipe sections welded together), separated into hot and cold sides by loose-fitting floating separator pistons which are disposed and travel longitudinally in the interior of the pipes. The high and low temperature sides of the thermal storage system can be optimized for specific applications based on the heat source characteristics and the temperature range of the thermal energy load/output device utilizing the stored thermal energy.

In the case of a generation system which utilizes a CSP system to store or charge the thermal storage system of this disclosure and an ORC heat engine to use the stored thermal energy to produce electricity, a high side temperature of approximately 280-300° C. and a low side temperature of 150-170° C. would be typical when using water as the working fluid. More generally, for other types of heat sources and thermal loads, typical system conditions for a thermal storage system according to this disclosure would range from of 200-360° C. on the hot side, and 80-170° C. on the cold side. A large temperature differential between the hot and cold sides of the storage system preferably allows a higher energy storage capacity for a given storage system working fluid volume.

The thermal storage system may be pressurized to keep the water used as the working fluid fully liquid under all operating conditions. As examples, a thermal storage system with a high temperature side operating at 200° C. would require a system pressure of above 225.3 psi (15.53 bar) to maintain a liquid state, whereas a system operating at 300° C. would require a minimum operating pressure of 1245.5 psi (85.9 bar). In general, the pressure range would typically be between 225 psi (15 bar) and 2700 psi (190 bar) to maintain a liquid state.

The use of a very low-cost heat transfer fluid (HTF), also referred to as working fluid, and thermal storage are key enablers to low life-cycle cost of energy (COE) solar CSP. Various types of working fluids may be used, such as water with or without additives, oil, refrigerants, molten salts, and other possible materials. Water may be the optimal choice for a working fluid, due to its low cost, high heat capacity, zero toxicity, low reactivity, and excellent fluid dynamics. By operating the thermal storage system over a broad temperature range, advantage can be taken of the high thermal capacitance of water to achieve high thermal-storage densities, therefore eliminating the need to change phase or add the complexity of steam accumulation.

While other working fluids may be used, they do have drawbacks. Thermal oil may operate at similar temperatures to water, but oil cost prohibits cost-effective bulk storage, and bulk thermal oils are a potential hazard. Molten salt freezes at typically about 220° C., is corrosive, and is costlier than water. Also, phase-change water storage (accumulators) may be used but they add complexity without substantial benefits in storage density.

Natural gas pipeline has increasingly pushed the limits of low-cost transport and storage of pressurized fluids by using stronger steels that can be formed into seamless pipe or can be rolled and welded into pipes at low cost and high reliability. In the disclosed system, low cost natural gas pipeline may be used to control system costs and provide for easier transport and construction. The use of shorter pipe sections, approximately 40 to 80 feet in length (approximately one-inch thickness one-meter diameter), enable easy transport via truck or rail. These shorter lengths may be welded together onsite to form long storage vessels (e.g. 300-1000 ft. in length) and they be connected in parallel via end manifolds to form a storage field. In terms of pipe diameter, increases in pipe diameter require related increases in pipe wall thickness to maintain material. In practice, pipeline diameters of 24 to 48 inches are preferable for this application, with current designs typically using a nominal 36 inch pipe outside diameter.

The use of commercially available pipeline sections to create the thermal storage vessels presents design challenges for the separator piston (discussed below) employed to maintain a thermal separation between the high and low temperature sides of each storage vessel. The pipe sections must maintain their concentricity as they are being transported, handled in the field, and joined together. In addition, any field welds done to join adjacent pipe sections together may require post-weld grinding or similar operation to ensure proper operating of the separator piston as it moves past these joints during operation. The floating separator piston design with its attendant seal system must be designed to accommodate the standard pipe tolerances of the specified commercial products used in this novel storage application as well as the finished welds used to create the completed storage vessels.

According to this disclosure, the thermal storage system is designed to use the same vessels/pipes for both hot and cold working fluid storage in order to reduce costs and optimize system operation. Operationally, the system should achieve full depth of discharge and charge, i.e. the hot water should be fully expended when fully discharged, and vice versa for full charging. The storage system is "charged" by collecting heat energy from a heat source (e.g. CSP) to its maximum temperature at the system pressure while being maintained in a liquid state and it is fully "discharged" by transferring the heat energy to the thermal load, e.g. an ORC heat engine. As thermal energy is collected and stored (i.e. charged), the piston in each pipe moves laterally to increase the high temperature volume and decrease the volume of the low temperature working fluid in the storage system. When discharged, the pistons move to increase the low temperature volume and decrease the high temperature volume At the system design pressures, pressurized water can reach a mid-300° C. range before vaporizing. Thus, using a single vessel/pipe to store both hot and cold working fluid presents real challenges. According to this disclosure, separation of hot and cold sides or sections in the pipes may be achieved with a floating separator piston. This piston must move freely while minimizing heat loss and thermal circulation between the hot and cold sides. The storage system must also handle substantial thermal expansion of the water when heated. The pressure vessels/pipe field must be insulated to minimize heat loss. Rock or mineral wool or calcium silicate insulation are viable candidates to provide sufficient insulation and to minimize losses during daily cycling of the thermal storage. Using pressurized water in steel pipes requires that the water be treated with anti-corrosion chemicals and filtered to minimize corrosion and fouling. Makeup water may be introduced as needed after filtration by the circulation pumps.

In terms of thermal energy storage capacity, a 100 m section of the above described pipe, with water as the working fluid, stores about 10.0 MWhth. At 24% thermal-to-electrical efficiency for an exemplary ORC heat engine, six hours of storage for a 1 MWe plant output would require about 250 meters of pipeline for thermal storage. For behind-the-meter 24/7 type applications, often fifteen or more hours of storage are required, which would be require over 600 meters of pipe. Such a long length pipe may be hard to site in many cases. According to an aspect of the thermal storage system described herein, in order to allow for use with more limited space available, the system may be configured with multiple shorter pipe sections connected in parallel rather than a single long length pipe. Notwithstanding the foregoing, various aspects of the system disclosed herein are applicable to both parallel pipe and single pipe configurations.

Prior art thermal storage systems have utilized a vertically oriented storage vessel to take advantage of the inherent thermocline effect where a hotter, less dense liquid sits above a heavier cooler volume. In a vertical tank configuration, a separator piston can also be used to provide increased separation and decreased heat transfer between the hot and cool sides of the energy storage system. With the horizontally aligned storage system disclosed herein, the system does not take advantage of any inherent thermocline; however, it presents multiple practical advantages. The advantages of the disclosed horizontal configuration include:

(1) Use of widely available and proven pipeline industry supply chain, construction methods, and infrastructure in a new configuration for this different application.

(2) the horizontal configuration integrates well with the overall layout of a suitably sized CSP collection system, allowing the addition of long duration storage to a CSP plant with a relatively small increase in footprint.

(3) the storage system is entirely at ground level, easing system O&M effort and costs.

(4) The storage system can be configured with multiple parallel pipelines, each equipped with a floating piston and operated in parallel. This configuration creates a modular system where individual sections in parallel can be isolated and shut down for service while allowing the overall storage system to remain in service. This configuration also allows the expansion of total energy storage capacity over time by adding additional pipelines in parallel.

Various configurations and aspects of the thermal storage system according to this disclosure are described in more detail below.

Thermal Storage System Configurations

Figure 1:
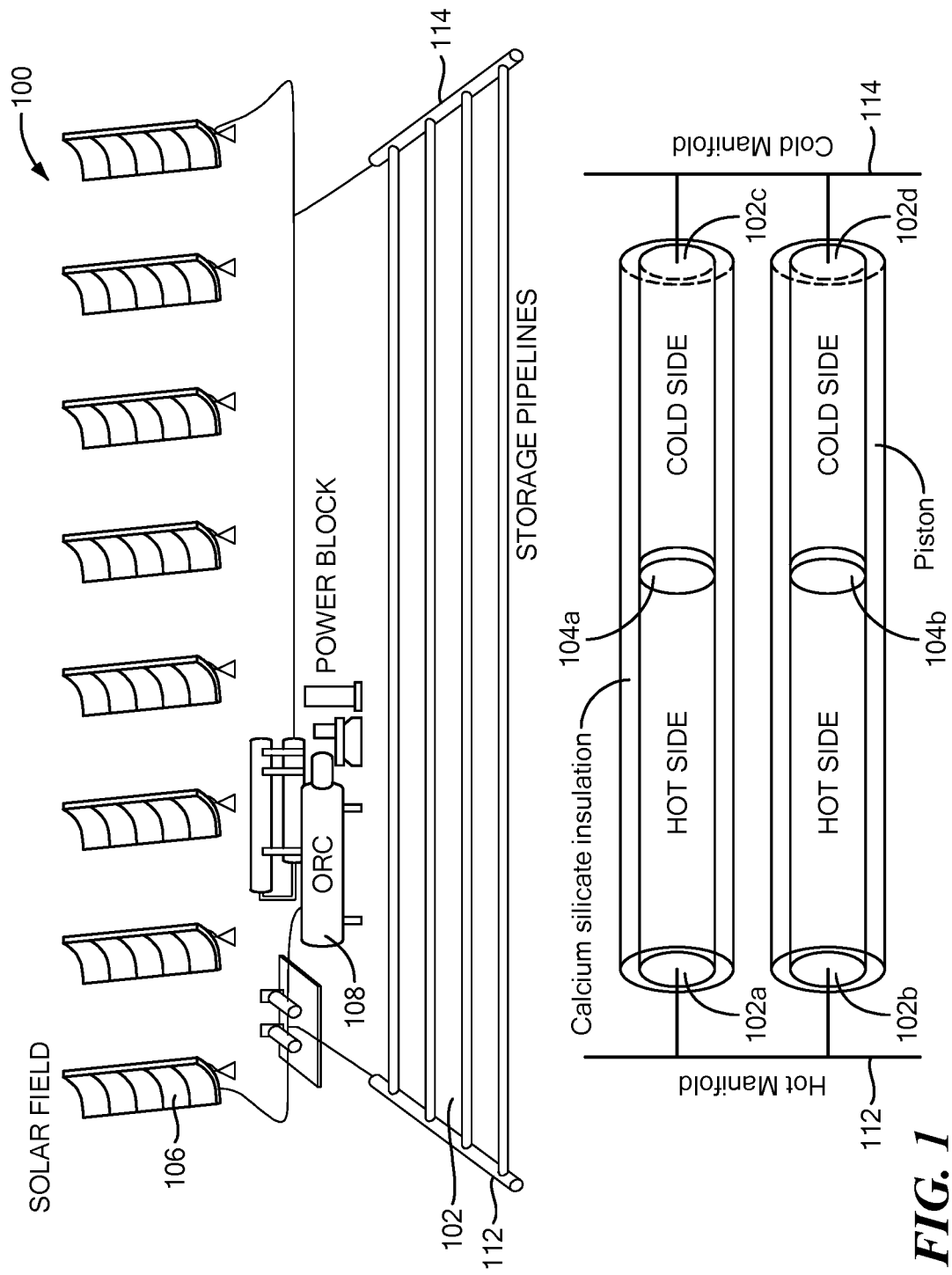
FIG. 1 shows a renewable and dispatchable energy generation system, including a thermal storage system in accordance with an embodiment of the present disclosure incorporated with a solar energy field as the heat source and an Organic Rankine Cycle (ORC) heat engine as the thermal load.

FIG. 1 shows a renewable and dispatchable energy generation system 100 in accordance with one embodiment of the present disclosure. System 100 includes a thermal storage system 102 with parallel arrangement of pipes, a heat source in the form of a solar field 106 (e.g. a CSP solar field), and a power block for a thermal load, which may be an ORC heat engine 108. The bottom portion of FIG. 1 illustratively shows in more detail a portion of the thermal storage system 102, including a parallel arrangement of pipe sections containing pressurized water divided into hot sides 102a and 102b and cold sides 102c and 102d separated by floating separator pistons 104a and 104b. The hot sides 102a and 102b of each of the pipes 102 are directly (or fluidly) connected to a first manifold 112 and the cold sides 102c and 102d of each of the pipes are directly (or fluidly) connected to a second manifold 114.

While not clearly shown in this figure, the first manifold 112 may be thermally connected to the output of the CSP solar field 106 to receive thermal energy and it may be thermally connected to the input of the input of the ORC system 108 to deliver the thermal energy to drive the ORC system 108 to produce electricity. As described in more detail below, heated water may be stored in the hot sides 102a/102b of the pipes, which may be directly or fluidly coupled to the output of the CSP solar field 106 and the input of the ORC system 108 by using a common working fluid or indirectly coupled via a heat exchanger.

The second manifold 114 may be thermally coupled to the input of the CSP solar field 106 and it may be thermally coupled to the output of the ORC system 108. Thus, the ORC system returns cold water after extracting thermal energy from the hot water to produce electricity. As described in more detail below, the cold water may be stored in the cold sides 102c/102d of the pipes, which may be directly or fluidly coupled to the CSP solar field 106 and the ORC system 108 by using a common working fluid or indirectly coupled via a heat exchanger.

The parallel configuration of pipes of thermal storage system 102 are disposed in a substantially horizontal direction relative to a surface on which thermal energy system 102 is disposed. The number of pipe sections in the parallel arrangement may be increased or decreased to achieve the amount of thermal storage required. Moreover, the lengths of the individual sections may be varied based on the amount of thermal storage required and also on the footprint available for installation of the thermal energy storage system. It should be noted that to form the longer pipe lengths, which may be required, shorter and more easily transportable pipe sections (e.g. 40-80 ft.) may be welded together onsite to form desired pipe lengths, e.g. 300-1000 ft.

As will be described in more detail below, the storage pipes may be arranged with the hot sides 102a and 102b inclined slightly with respect to the low temperature sides 102c and 102d to aid the floating separator pistons (104a and 104b) in separating the high and low temperature sides of the pipes.

It should be noted that each of the floating separator pistons, e.g. pistons 104a and 104b, may move independently, or their movement may be controlled. To control the pistons, a controller of the thermal storage system 102 may determine each piston position and then adjust the flow of working fluid to each pipe to control movement of the pistons. This adjustment may, for example, be performed through control valves or pump speed. This action may be carried out in a number of ways. One method is to equip each parallel pipe with a flowmeter, and use either a single system pump with flow control valves for each parallel pipe or a separate variable speed pump for each parallel pipe to maintain equal flow to each pipe. This method is relatively easy to implement, but it would need to account for potentially unequal piston bypass leakage performance among the parallel pipes.

An alternate method of controlling movement of the floating separator piston in multiple storage pipes in parallel is to measure pipeline temperature at multiple regular locations along the length of each pipe and to detect the high differential temperature that occurs on each side of the floating separator piston. The piston location input signal can then be used to control either flow control valves or variable speed pumps on each pipe circuit to manage the relative positions of the pistons, e.g. to keep the parallel pistons in synchronization or to move them sequentially. This method is described in more detail below.

Figure 2:
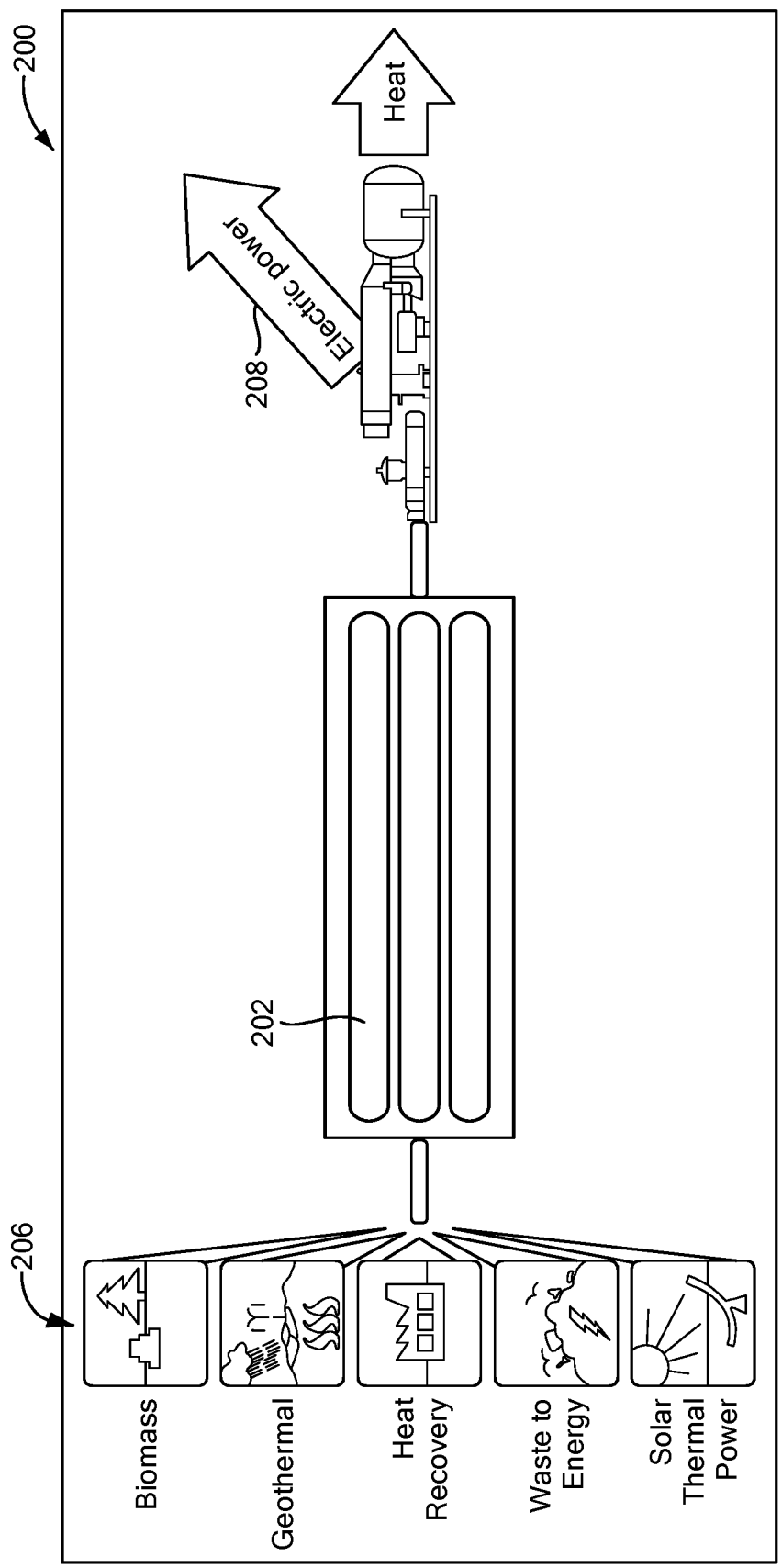
FIG. 2 shows a renewable and dispatchable energy generation system, including a thermal storage system in accordance with a related embodiment of the present disclosure depicting optional types of heat sources and thermal loads.

FIG. 2 shows a renewable and dispatchable energy storage system 200 using a thermal storage system 202 with a parallel configuration of pipes similar to that of parallel arrangement of FIG. 1. In this embodiment, it is illustrated that thermal storage system 202 may be integrated with one or more types of heat sources 206. Examples for heat sources 206 are a CSP solar field (linear, dish, tower, or other solar concentration systems), biomass/biofuel, geothermal energy, solar ponds, industrial heat recovery, and waste-to-energy. However, it is expressly contemplated that any other type of heat source may be used to charge the thermal storage system. It also illustrates that the thermal storage system may further be integrated with one or more types of thermal loads 208. Examples for thermal loads 208 are an ORC heat engine or other closed circuit gas turbine, a Stirling heat engine, steam turbine, or process heat for industrial applications.

As with the thermal storage system 102 of FIG. 1, thermal storage system 202 may be plumbed to directly or fluidly couple with heat source 206 and heat load 208, using a common working fluid or the thermal storage system 202 may be plumbed indirectly through heat exchangers to thermally couple with heat source 206 and heat load 208.

The number of parallel pipe sections may be increased or decreased to achieve the amount of thermal storage required. Moreover, the lengths of the individual sections may be varied based on the amount of thermal storage required and also on the footprint available for installation of the thermal energy storage system. Additionally, the storage pipes may be arranged with the hot sides inclined slightly with respect to the low temperature sides to aid the floating separator piston (not shown) in separating the high and low temperature sections of the pipelines. And, it should be noted that each of the floating separator pistons may move independently, or their movement may be controlled.

Figure 3:
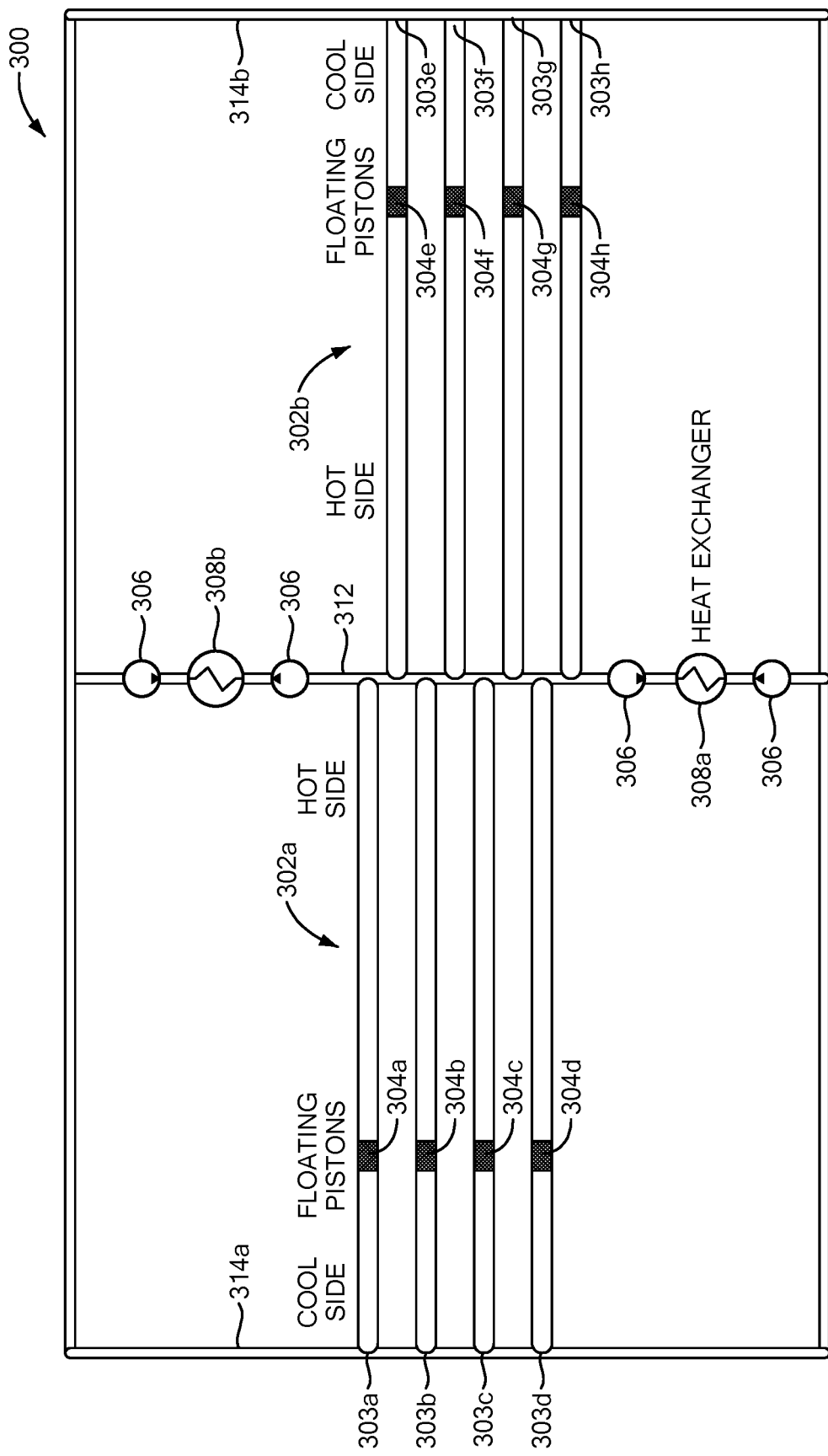
FIG. 3 shows a thermal storage system in accordance with a related embodiment of the present disclosure.

In FIG. 3 there is shown a thermal storage system 300 in accordance with an alternative embodiment of the present disclosure. In this figure, the connection of the heat source and thermal load is not explicitly shown, but it may be connected in the manner described above with regard to thermal storage systems 102 and 202 of FIGS. 1 and 2, respectively. Such connections will also be described in more detail with regard to FIGS. 4-7 below.

Storage system 300 can be configured with multiple sets 302a and 302b of pipes plumbed together in parallel to increase storage capacity. In this example, each set includes four (4) parallel pipes; for set 302a there are included parallel pipes 303a-303d and for set 302b there are included parallel pipes 303e-303h. Each parallel pipe is equipped with a floating separator piston 304 that separates the cold and hot portions of the working fluid. Parallel pipes 303a-303d include floating separator pistons 304a-304d and parallel pipes 303e-303h include floating separator pistons 304e-304h.

The hot sides of each of the pipes 303a-303h are fluidly coupled with a first or hot manifold 312 and the cold sides of each set of pipes are connected to a cold manifold. In this example, the cold sides of the pipes 303a-303d of set 302a are connected to second/cold manifold 314a and the cold sides of the pipes 303e-303h of set 302b are connected to third/cold manifold 314b. Although not shown in detail, first/hot manifold 312 is thermally connected to the output of a heat source to receive thermal energy and it is also connected to the input of a thermal load to provide thermal energy to the thermal load. The connections may be direct, using a common working fluid, or indirect using a heat exchanger, such as heat exchanger 308a. In addition, the second/cold manifold 314a and the third cold manifold 314b are thermally connected to the input of the heat source and to the output of the thermal load either directly, using a common working fluid, or indirectly using a heat exchanger, such as heat exchanger 308b.

The pistons 304a-304h translate back and forth along their respective pipes in response to the system pumps 306 moving fluid from one side of the pipes to the other side. The pistons 304a-304h may simply be allowed to react independently to the fluid flow and, therefore, they may move at different rates during charge and discharge cycles of the storage system. Alternatively, the pistons' respective positions can be monitored and controlled to move in a coordinated way. This action may be carried out in a number of ways. One method is to equip each parallel pipe 302a-302h with a flowmeter, and use either a single system pump with flow control valves for each parallel pipe or a separate variable speed pump for each parallel pipe to maintain equal flow to each pipe.

An alternate method of controlling separator piston 304a-304h movement in storage pipes 302a-302h is to measure pipeline temperature at multiple regular locations along the length of each pipe and to detect the high differential temperature that occurs on each side of the floating piston 304. This piston location input signal can then be used to control either flow control valves or variable speed pumps on each pipe circuit to manage the relative positions of the pistons, e.g. to keep the parallel pistons in synchronization or to move them sequentially.

While the storage pipes are described as typically being substantially horizontal in the thermal storage system disclosed herein, the pipes can also be configured with a slight angle or incline relative to the horizontal to augment the ability of the floating separator piston to separate the high and low temperature sides, wherein the high temperature side is positioned above the low temperature side.

As shown in FIG. 3A, pipe 303a is depicted with its hot side end installed at a height $H_1$ above the surface on which thermal storage system 300 is installed, while the cold side end is installed at a lower height H2, so that pipe 303a is inclined at a slight angle, $\Theta$. In practice this angle, $\Theta$, would be quite small, typically from 0.25 to 2 degrees from the horizontal position.

Any of the parallel pipe configurations disclosed herein may utilize inclined pipes as described in FIG. 3A. Moreover, such an inclined pipe may be beneficial even in a storage system having a single pipe and using a separator piston with a liquid phase, pressurized working fluid, according to an aspect of this disclosure.

Figure 4:
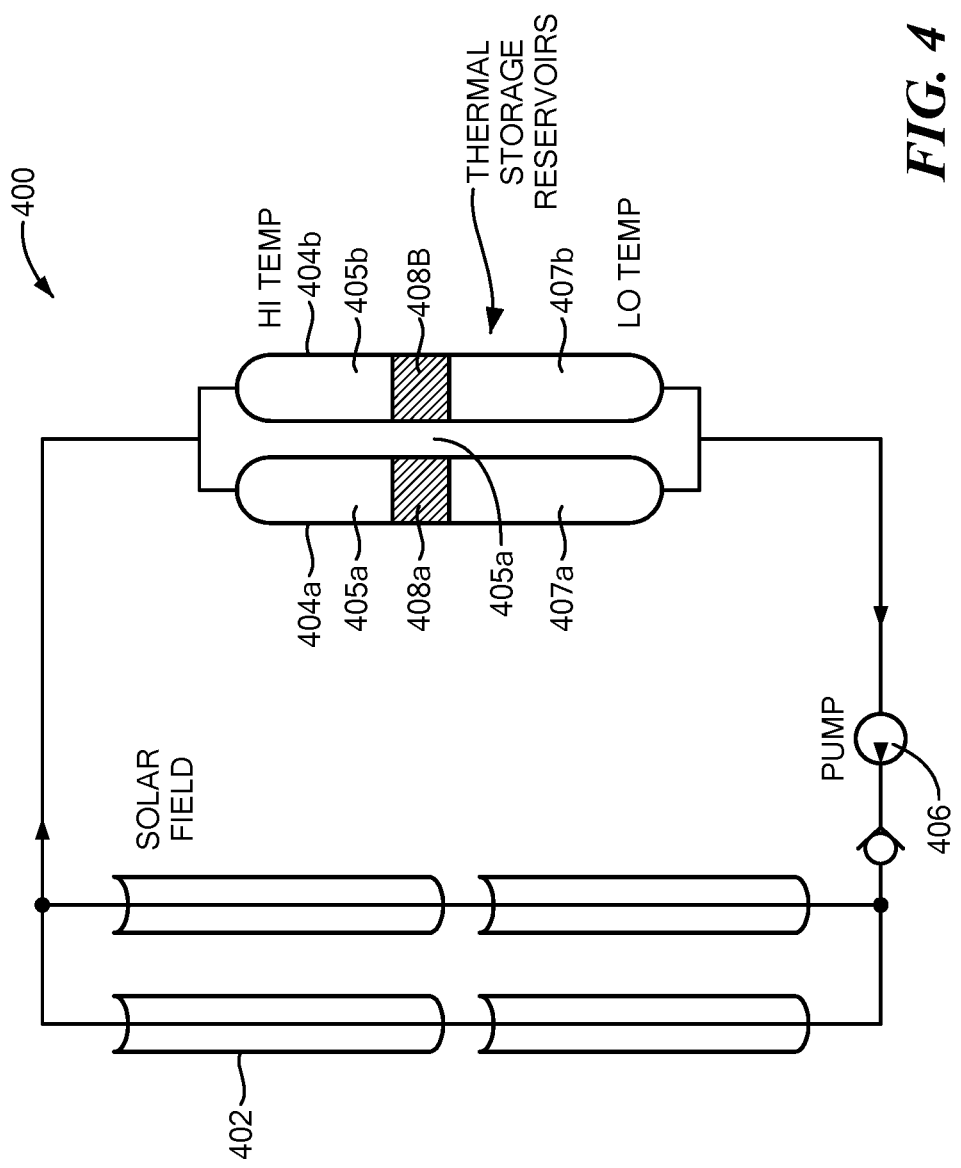
FIG. 4 shows a thermal storage system coupled with a concentrating solar power (CSP) heat source using a common working fluid in accordance with a related embodiment of the present disclosure.
Figure 5:
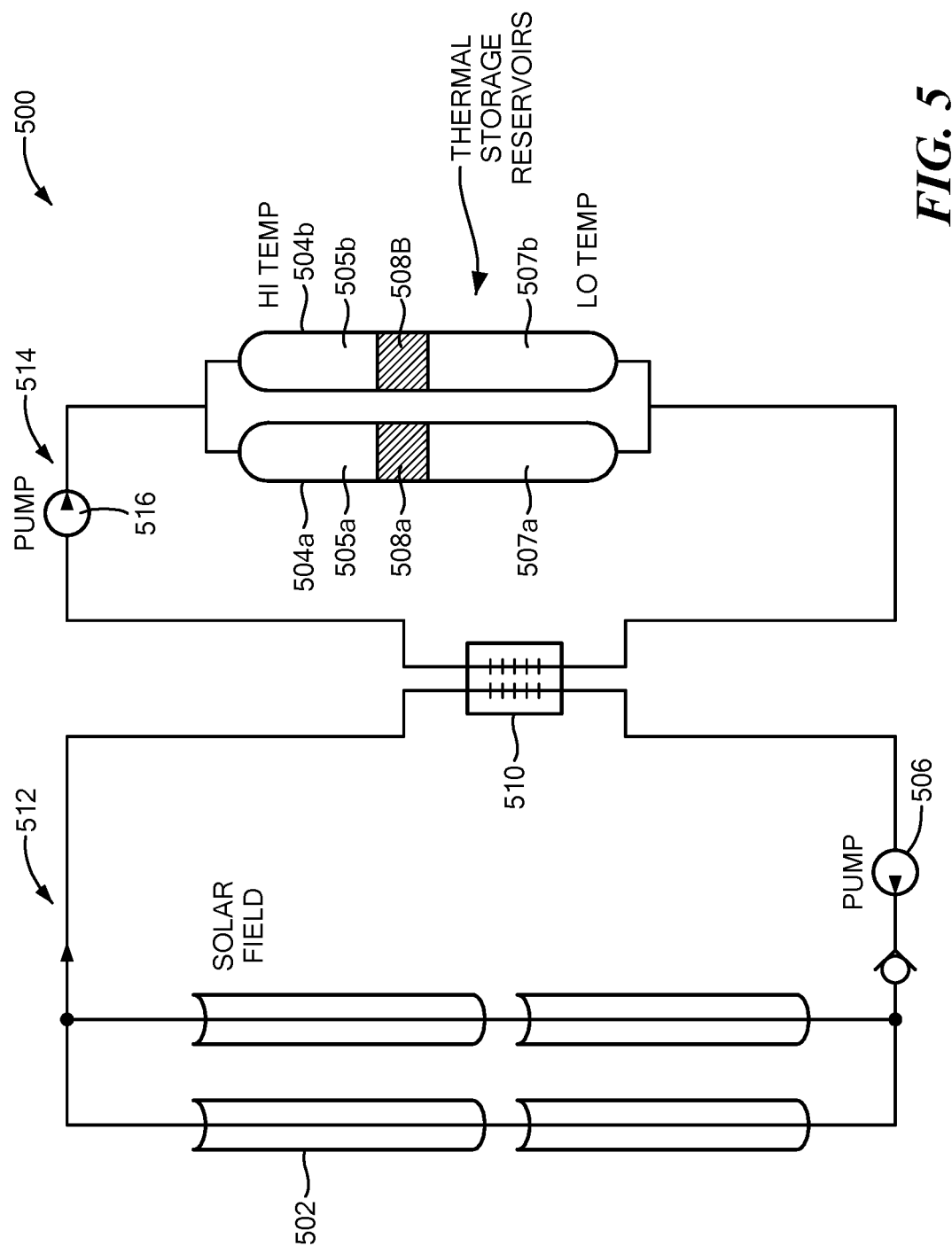
FIG. 5 shows a thermal storage system coupled with a CSP heat source using a heat exchanger to transfer thermal energy to the storage system in accordance with a related embodiment of the present disclosure.

FIG. 4 depicts how the thermal storage system according to this disclosure may use a common working fluid to directly and fluidly couple the thermal storage system to the heat source. In FIG. 5, described below, it is shown how to indirectly couple the thermal storage to the heat source using a heat exchanger. In order to simplify the descriptions of FIGS. 4 and 5, thermal loads and their interconnections to the thermal storage systems are not shown.

Thermal storage system 400, FIG. 4, may be directly charged from a heat source 402, such as a CSP system, through a common working fluid. The working fluid is circulated through the CSP 402 by pump 406, where heat energy is transferred to the working fluid, and then circulated and stored in the storage pipes 404a and 404b. High temperature working fluid heated by the CSP 402 is transferred into the "hot" side 405a and 405b of the thermal storage pipes 404a and 404b, respectively. The "cold" fluid from the low temperature or cold sides 407a and 407b of storage pipes 404 is transported also by pump 406, to the intake of CSP 402 for heating. As this process progresses, the thermal separator pistons 408a and 408b, located within each one of the storage pipes, translates from the hot side of the pipe to the cold side as the storage system stores more heat during charging. When the system transfers heat to a thermal load (not shown) while discharging the floating separator pistons 408a and 408b move in the opposite direction to allow more storage fluid for the cold fluid.

By using pressurized hot water as a working fluid to pass thermal energy directly from the heat source (CSP 402) to the thermal storage system 400, it eliminates the need for a heat exchanger between the heat source and the thermal storage system, simplifying the system design, potentially decreasing cost, and increasing overall system efficiency. It should be noted that the operating pressure required to keep the water working fluid in the liquid state can be higher than the pressure rating of current off-the-shelf solar receiver tubes in CSP systems. Therefore, the solar receiver tubes must be specified with the appropriate pressure rating, increasing the receiver tube wall thickness and material cost. However, in most cases this will be a favorable tradeoff, and the direct fluid coupling approach using a common working fluid will be preferable. The direct fluid coupling may be applied to other types of heat sources as well.

Notwithstanding a preference for a direct fluid coupling, an indirect thermal connection between the heat source and the thermal storage system may be desired. Such a connection is depicted in FIG. 5, where thermal storage system 500 is indirectly charged from a heat source through a heat exchanger 510. In this configuration, the working fluid in the CSP 502 may include thermal oil or molten salt, while pressurized water would be used in the storage pipes 504a and 504b. A pump 506 circulates a first working fluid in the heat source loop 512 through the CSP collectors 502, where the working fluid is heated, and then to the heat exchanger 510. From the heat exchanger the first working fluid returns to the input of the CSP 502. The heat exchanger 510 transfers the thermal energy in the first working fluid to the second working fluid (i.e. pressurized water in the liquid phase) in the thermal storage loop 514, where it is circulated by pump 516.

In the thermal storage loop, high temperature working is transferred into the "hot" side 505a and 505b of the thermal storage pipes 504a and 504b, respectively. The "cold" fluid from the low temperature or cold side of the 507a and 507b of storage pipes 504a and 504b is transported to the cold return of heat exchanger 510. As this process progresses, the thermal separator pistons 508a and 508b located within each one of the storage pipes translates from one end of the pipe to the other as the storage system stores heat during charging and then transfers heat to a thermal load (not shown) while discharging.

Figure 6:
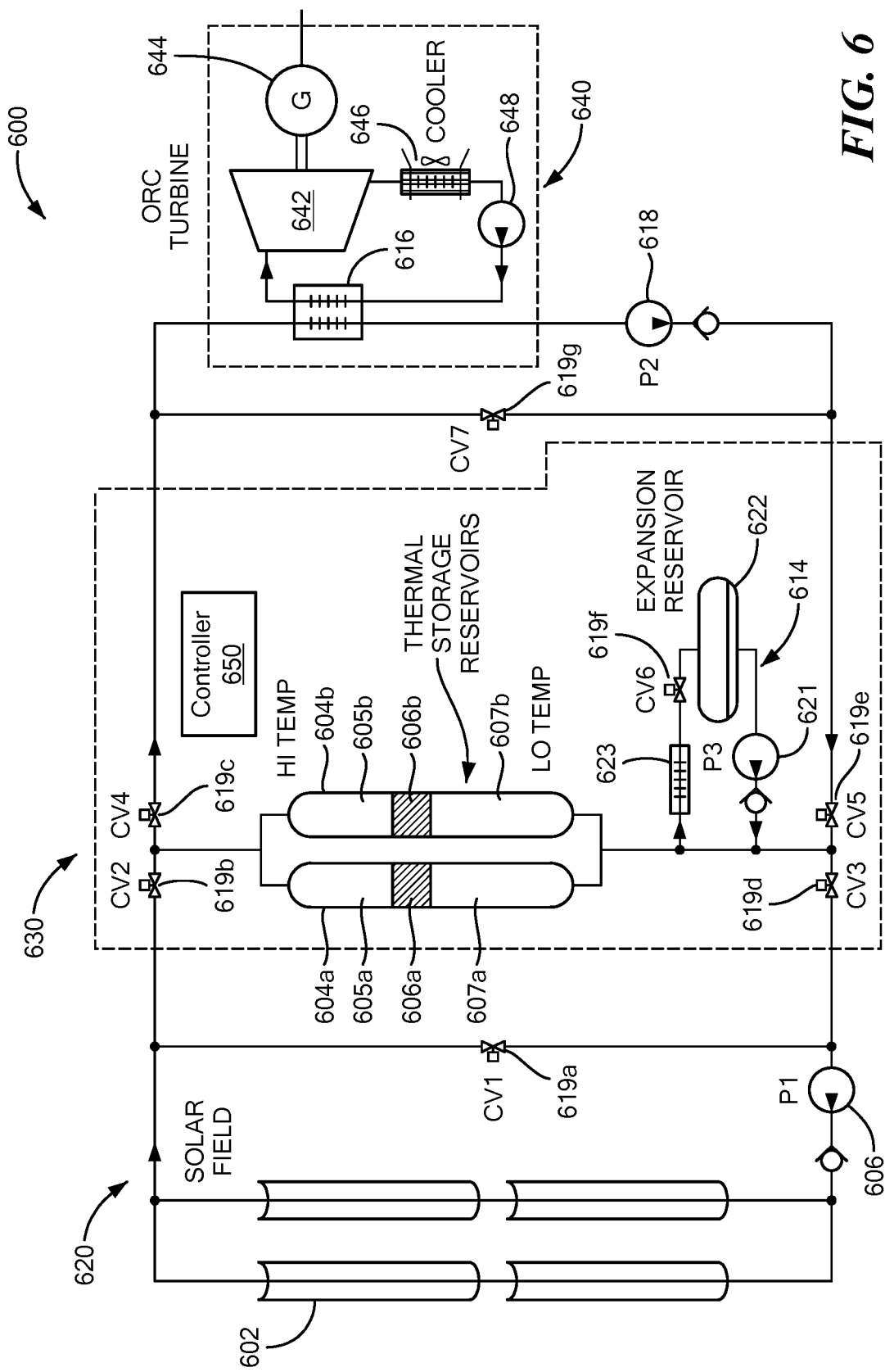
FIG. 6 shows a renewable and dispatchable energy generation system, including a thermal storage system coupled with a CSP heat source and an ORC heat engine using a common working fluid in accordance with a related embodiment of the present disclosure.

FIG. 6 shows a renewable and dispatchable energy generation system 600 in accordance with this disclosure, which includes a heat source, i.e. CSP 620, thermal storage system 630 and a heat load, i.e. ORC heat engine 640. The solar concentrators 602 of CSP 620 and thermal storage system 630 are directly/fluidly coupled using a common working fluid (e.g. pressurized water in liquid phase) in the same manner as is system 400 of FIG. 4. The common working fluid is also used to transfer thermal energy to the ORC heat engine via an integrated heat exchanger 616 to extract thermal energy to generate electricity.

Thermal storage system 630 may be directly charged from heat source 620 through a common working fluid. The working fluid is circulated through the CSP 602 by pump 606 (P1) where heat energy is transferred to the working fluid and stored in the storage pipes 604a and 604b of thermal storage system 630. High temperature working fluid heated by the CSP 602 is transferred into the "hot" side 605a and 605b of the thermal storage pipes 604a and 604b, respectively. The "cold" fluid from the low temperature or cold side of the 607a and 607b of storage pipes 604 is transported also by pump 606, to the intake of CSP 602 for heating.

When the thermal storage system is being charged, the control valves 619 are used to circulate the working fluid only between the heat source 620 and thermal storage system 630 and to isolate and separate the thermal load 640 from the thermal storage system 630. This is done by opening valves 619b (CV2) and 619d (CV3) and closing valves 619a (CV1), 619c (CV4), and 619e (CV5).

Thermal storage system 630 may be discharged from storage system 630 to ORC heat engine 640 through the common working fluid. The working fluid is circulated by pump 618 (P2) from storage system 630 to heat exchanger 616 of ORC heat engine 640. During discharge, the control valves 619 are used to circulate the working fluid only between the thermal storage system 630 and the ORC heat engine 640 and to isolate and separate the heat source 620 from the thermal storage system 630. This is done by opening valves 619c (CV4) and 619e (CV5) and closing valves 619g (CV7), 619b (CV2), and 619d (CV5). As a result, high temperature working fluid is transferred from the "hot" side 605a and 605b of the thermal storage pipes 604a and 604b, respectively, to the input of the heat exchanger 616 in the ORC heat engine 640. The "cold" fluid passing out of the heat exchanger 616 is transferred back to the low temperature or cold side 607a and 607b of storage pipes 604a and 604b.

The ORC heat engine includes a turbine 644 that receives a heated fluid (e.g. steam) heated by heat exchanger 616 which spins the turbine and drives generator 646. The generator 646 produces electricity. The fluid output by turbine 642 is cooled by cooler 646, which could be a wet or dry cooler, and returned to the input of heat exchanger 616. The fluid is circulated in the ORC heat engine loop by pump 648.

Also shown in FIG. 6 is expansion system 614 to account for changes in fluid density and therefore total fluid volume as the thermal storage system 630 goes through charge and discharge cycles. Expansion system 614 includes a control valve 619f (CV6), pump 621 (P3), an expansion tank 622, and cooler 623. When fully charged, the fluid in the storage pipes 604a and 604b is at a higher temperature condition, and therefore the pressurized water is at a lower density and requires additional system volume. The thermal expansion system 614 allows the storage system 630 to operate without water loss and replenishment as it is charged and discharged. Alternatively, the thermal storage pipes 604a and 604b may be sized to be only partially filled at the fully discharged condition to accommodate the variable fluid density and volume difference between the charged and discharged state of the system.

There is also shown a controller 650 which may control the operation of the various valves and pumps in order to charge and discharge the storage system 630 as is described in more detail under the "storage system control" section below. The controller 650 may comprise an industrial PLC, remote I/O, and supporting components to provide safety and control functionality. The controller 650 may interact with a separate or integrated higher level controller which may provide overall control of the heat source 620, storage system 630 and heat load 640. The operation of the higher level controller is described below in more detail with regard to FIGS. 16-18.

Figure 7:
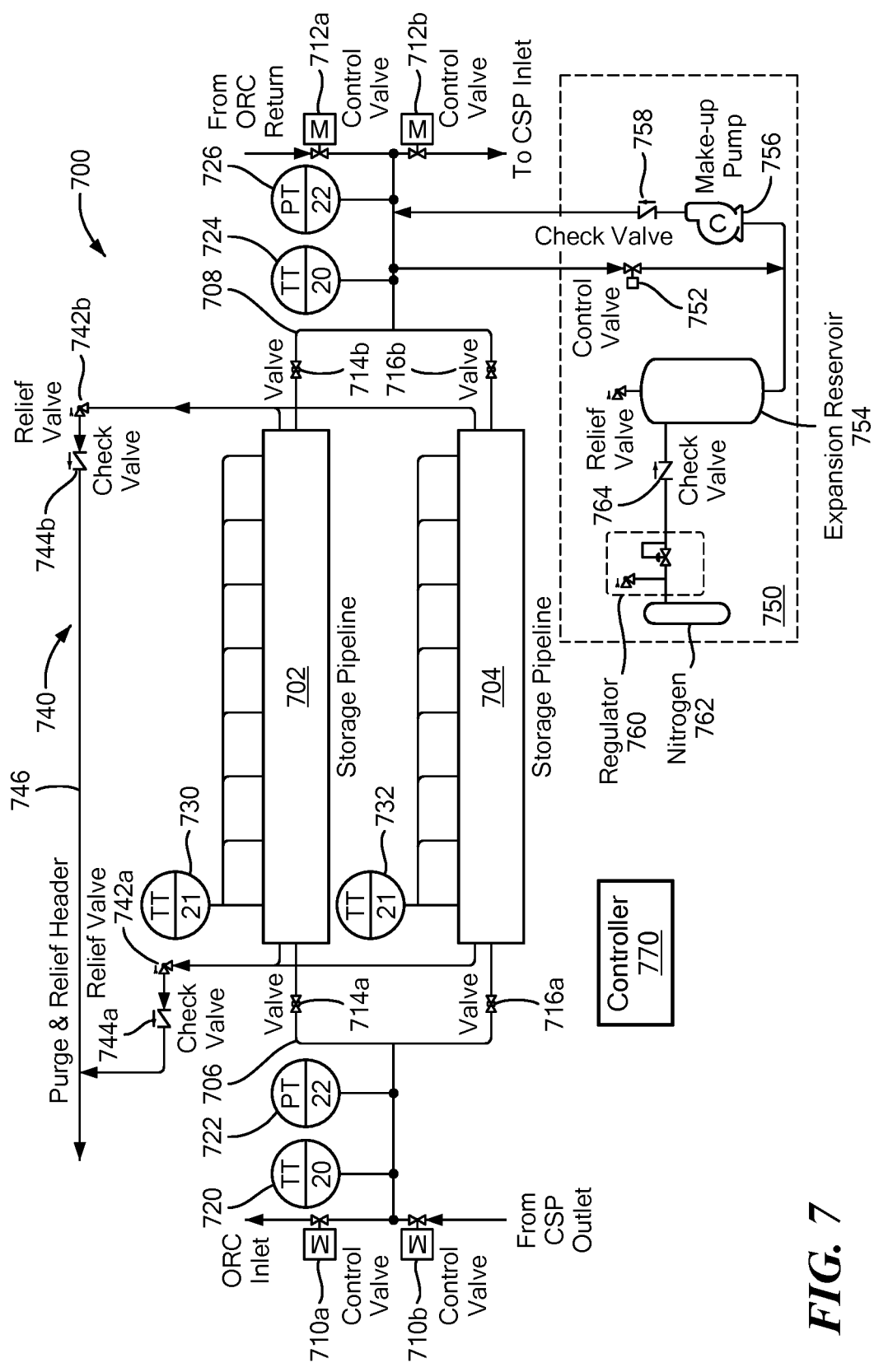
FIG. 7 shows a piping and instrumentation diagram of a thermal storage system in accordance with a related embodiment of the present disclosure.

FIG. 7 shows a piping and instrumentation diagram of a thermal storage system 700 in accordance with a related embodiment of the present disclosure. While not shown in this figure, the thermal storage system 700 may be interconnected to a CSP heat source and an ORC heat engine heat load. Thermal storage system 700 includes storage pipes 702 and 704 to store the working fluid, which pipes are connected in parallel to first/hot manifold 706 and second/cold manifold 708.

The first/hot manifold 706 may be connected to the inlet of the ORC heat engine and the outlet of the CSP via control valves 710a and 710b, respectively, to allow the heated working fluid to be transferred between the hot sides of pipes 702 and 704 and either the CSP or ORC heat engine. The second/cold manifold 708 may be connected to the return/outlet of the ORC heat engine and the inlet of the CSP via control valves 712a and 712b, respectively, to allow the cold working fluid to be transferred between the cold sides of pipes 702 and 704 and either the CSP or ORC heat engine.

Valve 714a on the hot side of pipe 702 and valve 714b on the cold side of pipe 702 may be opened to take pipe 702 out of the fluid circuit when service is needed and it may be closed to place pipe 702 in service by connecting it to first/hot manifold 706 and second/cold manifold 708, respectively. Similarly, valve 716a on the hot side of pipe 704 and valve 716b on the cold side of pipe 704 may be opened to take pipe 704 out of the fluid circuit when service is needed and it may be closed to place pipe 704 in service by connecting it to first/hot manifold 706 and second/cold manifold 708, respectively.

To monitor and control the temperature and pressure of the working fluid at the first/hot manifold 706 there are included temperature sensor 720 and pressure sensor 722. To monitor and control temperature at the second/cold manifold there are included temperature sensor 724 and pressure sensor 726. As described above, the system maintains the working fluid in the liquid state, so as the temperature of the working fluid rises, the pressure in the system must be increased. Pressure control is accomplished by increasing/decreasing the flow of the pumps in the CSP working fluid loop and/or the ORC heat engine working fluid loop. The pressure may also be controlled by the control valves 710a/710b and 712a/712b. Maintaining the working fluid in a liquid state can also be accomplished by controlling the expansion system 750, described below.

Temperature sensors 730 and 732 are included with storage pipes 702 and 704 respectively to measure temperatures at a plurality of locations along the lengths of the pipes. These temperature measurements may be used to control the movement of the separator pistons (not shown) as they translate along the pipe as the storage pipes are charged and discharged with the working fluid. The control scheme using the temperature sensors will be described below.

There may also be included a purge and relief system 740 which includes a connection from the hot sides of pipes 702 and 704, via purge relief valve 742a and check valve 744a, to header 746. Purge and relief system 740 also includes a connection from the cold sides of pipes 702 and 704, via purge relief valve 742b and check valve 744b, to header 746. The purge and relief system may be operated by a system controller for pressure relief to maintain system integrity in case of high pressure fault conditions In addition, thermal storage system 700 may include an expansion system 750 to accommodate the change in fluid volume between the fully charged and fully discharged states. Expansion system 750 may operate in the manner that expansion system 614, FIG. 6, operates as described above. The system includes control valve 752, which can connect the second/cold manifold 708 to expansion reservoir. There is a pump 756 and check valve 758 which may return the working fluid from the reservoir tank 754, as needed. There is also a regulator which may provide a flow of nitrogen from tank 762 to expansion reservoir 754 via check valve to maintain the correct pressure in the expansion tank.

There is also shown a controller 770 which may control the operation of the various valves and pumps in order to charge and discharge the storage system 740 as is described in more detail under the "storage system control" section below. The controller 770 may comprise an industrial PLC, remote I/O, and supporting components to provide safety and control functionality. The controller 770 may interact with a separate or integrated higher level controller which may provide overall control of the heat source, storage system and heat load. The operation of the higher level controller is described below in more detail with regard to FIGS. 16-18.

Figure 8:
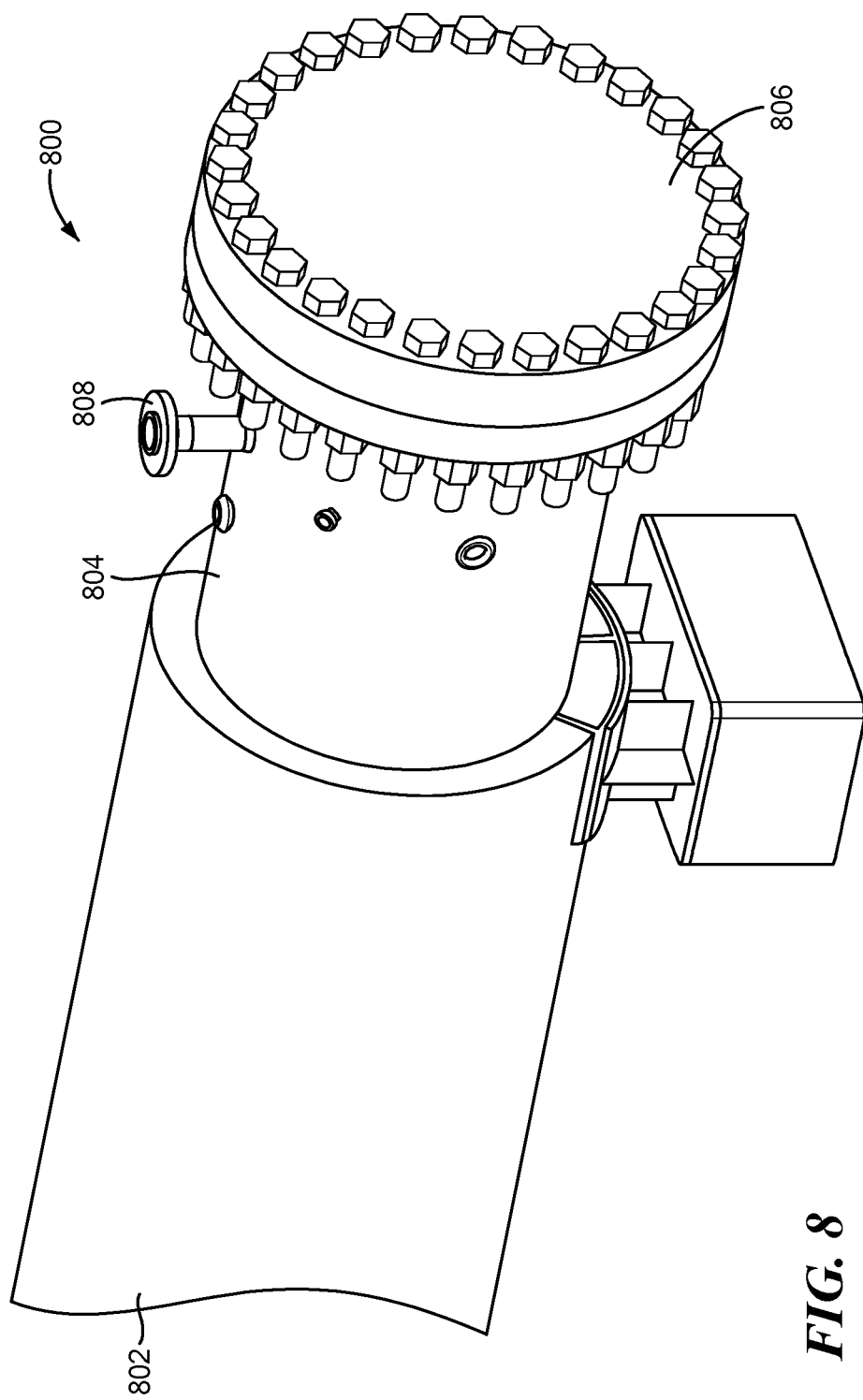
FIG. 8 shows an example of a pipe service or access port in accordance with an aspect of the present disclosure.

FIG. 8 shows an example of a pipeline service or access port 800, which may be utilized in any of the pipe configurations described herein. Each parallel storage pipe 802 may include an access port 800 including a standard weld neck flange 804 and a blind flange 806 at one end for the floating separator piston installation and service access, and either the same configuration or a closed cap at the opposite end. Both ends of each parallel pipe are equipped with a main port 808 for transferring pressurized water during charge and discharge cycles, and additional ports (not shown) for instrumentation such as fluid temperature, pressure, level, and potentially water chemistry.

The pipes disclosed herein are supported on industry standard pipeline supports, with provisions to allow for axial movement as the pipe sees full shutdown, charging, and discharging operating conditions. The overall pipe storage assembly may be insulated with rock or mineral wool or calcium silicate insulation, with a rainproof cover over the assembly. The insulation may be required to meet the systems charge/discharge cycle efficiency specifications, and also limit the surface temperature of the system as required for safety code compliance.

All storage pipe components described in herein are standard parts common in the pipeline industry, which are currently produced in volume. This is a significant advantage of the described thermal storage system. The storage pipes are largely fabricated from existing O&G and industrial pipeline and pressure vessel technology and materials. Individual pipe sections may be welded together at the field site, or partially assembled into the maximum transportable length in a factory setting and then moved to the field site for final assembly. The length of each pipe assembly will be dictated by required thermal storage capacity, number of individual pipes connected in parallel, and the site space limitations. A typical system might use as an example three 1 m (outer diameter) pipelines in parallel, each 250 m in length.

In addition to the storage pipes described herein, the manifolds, piping, and valves to connect multiple storage pipes in parallel, and to transfer the HTF between the hot and cold sides of the system may be standard components. The pumps described herein may be designed for operation with pressurized fluid on both the intake and outlet sides while operating at a low relative pump head.

Storage System Control

The storage control system may be implemented with software or firmware running on controller 650, FIG. 6, or controller 770, FIG. 7, to maintain the liquid state of the working fluid for pressurized water storage in a thermal storage system. It may also be used to coordinate control of the floating separator pistons in the systems of FIGS. 6 and 7, as described in the remainder of this section. It should be noted that these controllers may interact with or be implemented as part of a system level controller as described below with regard to FIGS. 16-18.

Closed liquid systems typically utilize an expansion system to protect against excessive system pressure changes due to fluid thermal expansion or other system variations during operation. Most expansion systems are passive in nature, with an expansion tank charged to a minimum system pressure and with sufficient volume to help maintain a consistent system pressure during operation as system conditions change and the working fluid expands and contracts. The described thermal storage system similarly uses a closed pressurized working fluid, which increases and decreases in density and volume as system conditions change and the thermal storage system is charged and discharged. The fluid volume increases as the thermal energy storage system charges, and conversely decreases as the storage is discharged. To accommodate the substantial changes in fluid volume in the described storage system, which can exceed 40% in some cases when using water as the working fluid, an actively controlled expansion system is described.

With the storage systems described in this disclosure, e.g. systems 600 and 700, active control of the expansion systems may be used. A valve of the expansion system may be used to bleed working fluid into an expansion tank when pressure increases above a setpoint. Conversely, an injection pump of the expansion system may be used to drive fluid back into the system to increase pressure when below the setpoint. The pressure setpoint is chosen based on the maximum fluid temperature so as to keep the fluid pressure sufficiently above its saturation pressure, and thus maintain the working fluid completely in the liquid state. Allowing the working fluid to flash into the vapor or gaseous state will disrupt the storage system operation and introduce safety hazards for both personnel and equipment.

The expansion tank is sized based on the total fluid volume in the system, and the maximum change in fluid density and volume across all operation states including fully charged to fully discharged conditions.

Control: System pressure is measured at the outlet of the CSP or other thermal energy supply, and used as a control input signal to the pressure control system. A sufficient setpoint dead band is maintained so as to avoid short cycling of the liquid state control system.

Pressure>Setpoint: Bleed off HTF from the storage system through an actuator-equipped control valve into the expansion tank. The pressure in the expansion tank is maintained at a level above the saturation pressure at the low side system temperature with a typical nitrogen charged accumulator.

Pressure<Setpoint: When system pressure drops due to discharge of the thermal storage system or other system conditions, the injector pump is operated to return fluid from the expansion tank into the storage system to increase the system pressure to the desired setpoint.

An additional refinement of this control system can be the addition of active monitoring of the fluid temperature exiting the CSP or other thermal energy supply, and adjusting the pressure setpoint to reflect the changing vapor pressure and therefore minimum required system pressure to maintain a fully liquid state for the working fluid. This addition may offer some operating advantages in terms of system flexibility and safety.

It should be noted that the floating separator pistons described herein may be configured to move passively and independently of each other in the various parallel vessel arrangements. Alternatively, controllers 650/770 may control and coordinate movement of the floating separator pistons in multiple storage pipes. The pistons may be controlled to move in synchronization, for example, within a parallel vessel arrangement. To synchronize the pistons, the controller of the thermal storage system configurations according to this disclosure may determine each piston position within its respective vessel and then adjust the flow of working fluid to each vessel to keep the piston movements synchronized. This adjustment may, for example, be performed through control valves or pump speed adjustments. This action may be carried out in a number of ways. One method is to equip each parallel pipe with a flowmeter, and use either a single system pump with flow control valves for each parallel pipe or a separate variable speed pump for each parallel pipe to maintain equal flow to each pipe. This method is relatively easy to implement, but it would need to account for potentially unequal piston bypass leakage performance among the parallel pipes.

An alternate method of controlling movement of the floating separator piston in multiple storage pipes in parallel is to measure pipeline temperature at multiple regular locations along the length of each pipe (as do temperature sensor 730/732 along pipes 702/704 of FIG. 7) and to detect the high differential temperature that occurs on each side of the floating separator piston. This piston location input signal can then be used to control either flow control valves or variable speed pumps on each pipe circuit to keep the parallel pistons in synchronization.

While in some cases it may be advantageous to synchronize the positions of the pistons as they travel back and forth along their pipelines, in some instances it may be more of an advantage to charge and discharge the multiple pipelines in a sequential fashion. Conversely, if the thermal energy losses from the storage pipes are significant there could be an operating advantage to maintaining a level of synchronization among the pistons in the multiple pipelines. The storage temperature could then remain more consistent among the pipelines because they fill at a similar rate and have a similar time in storage before discharge.

In another case, the inlet temperature to the heat load (e.g. an ORC) may be controlled by selectively adjusting flow rates from multiple storage pipelines housing fluid at slightly varying temperature levels. Basically, output from cooler pipelines could be used to temper output from hotter ones to manage the fluid temperature delivered to the heat load.

Floating Separator Piston Designs

A key aspect of the thermal storage system described herein is the design of a floating separator piston that can travel axially along the pipes while separating the changing hot and cool sections within the pipes as the storage system is charged or discharged using a common working fluid. The piston must move freely along the full length of the interior region of the pipes in a response to small differences in pressure, typically below 5-10 psi, while providing sufficient sealing to separate the hot and cold sides of the working fluid stored within the storage vessel, even with storage vessels having interior surfaces with variable roughness (i.e. non-honed surface). In other words, the floating piston must engage with the inner surface of the pipe with a sufficiently small amount of friction that it allows movement of the piston in the pipe with low pressure differential, but also create a sufficient thermal/fluid seal. These requirements are more challenging to realize with the floating large separator piston diameters (typically 0.75 m-1 m) needed for this application. The piston must also withstand the full temperature and pressure conditions of the storage system, and exhibit a long service life with minimal O&M support.

The various embodiments of the floating separator piston disclosed herein are designed to meet the following design requirements:

(1) withstand wide temperature variations, and be capable of operation at temperature in excess of 300° C.

(2) withstand high working fluid working pressures in excess of 100 bar.

(3) seal sufficiently to the pipeline inner surface to limit fluid bypass across the piston between the hot and cool regions of the pipeline storage volume.

(4) move back and forth along the pipeline under forces from pumping the working fluid from one side to the other of the storage system.

(5) provide a sufficient thermal break or insulating properties to limit heat flow across the piston from the hot to the cold side.

(6) have a long working life, and be accessible for service if required.

There is shown in a perspective view in FIG. 9A and in a cross-section in FIG. 11, a floating separator piston 900 in accordance with an aspect of the present disclosure. The piston 900 is cylindrically shaped and has at each end one or more sealing rings 904, and one or more outboard rider rings 906. In a central region of the piston, between the sealing rings 904, is a cylindrically shaped, low porosity, low permeability and compressible seal 902 (shown in phantom) seated in a recessed area 903 of about the circumference of the piston. This piston design must serve multiple functions, including to provide a seal against fluid bypassing between the piston ends, to provide thermal isolation, and to limit friction in order to allow the piston to move or translate along the pipe. The piston must realize these features while providing an acceptable service life.

The described compressible center seal is designed using a highly compressible, limited porosity material with a substantial axial dimension instead of attempting to create a point seal using a non-porous material as in a typical piston ring constrained in a groove. One preferable version uses a multi-layer Kevlar felt material to create the overall seal assembly. Another version may be made of a glass fiber material. The highly compressible nature of this seal design allows the piston to operate inside a storage vessel fabricated from commercially available steel pipe with a variable surface roughness, as opposed to a typical cylinder bore used for most piston applications, which are typically machined and honed to a close tolerance.

The seal performance can be tailored to the application by specification of the uncompressed porosity of the seal material, the degree of compression of the seal assembly once the piston is installed in the pipeline, and the overall axial length of the seal. The resulting seal porosity is designed to limit the bypass leakage across the separator piston to no more than 5-10% of the storage system's overall thermal losses over a complete daily charge/discharge cycle. This level of performance can be achieved with various combinations of seal porosity properties, degree of seal compression, and seal length.

This seal is applied around the center of the piston's body in a recess designed to both retain the seal 902 and to allow room to accommodate initial seal compression. The seal 902 should extend over a significant portion of the overall axial length of the piston 900, increasing the pathway length for fluid to bypass the piston. The seal 902 typically extends along 50-90% of the length of the piston for best performance.

The compressible material of the seal 902 is compressed when the piston 900 is installed in the pipe to create a prevailing pressure against the pipe's inner surface and to create an effective seal, but also allow for movement within the pipe, i.e. move freely in response to small differences in pressure on either end of the piston, typically below 5-10 psi. For example, the seal 902, when inserted into the pipe may be compressed to a thickness of 25-75% of its natural state. Therefore, in its uncompressed state the diameter of the seal would extend beyond the outer surface of the piston, such that when the piston is installed the in the pipe, the seal in the compressed state will have substantially the same outer diameter as the outer diameter of the piston.

The floating separator piston herein will typically have a symmetrical design; however, this is not a requirement of the piston according to this disclosure.

Multiple material candidates could be considered for the compressible seal 902. Kevlar felt is advantageous because it can withstand the temperature and pressure conditions found in this thermal energy storage application. The Kevlar felt may be arranged in one layer or in a plurality of layers. A plurality of layers of Kevlar felt may be stitched together with Kevlar stitching and retained in a recess fabricated into the piston center section by banding straps. Alternate seal materials, such as felted glass may be selected depending on the design pressure and temperature requirements.

Figure 9C:
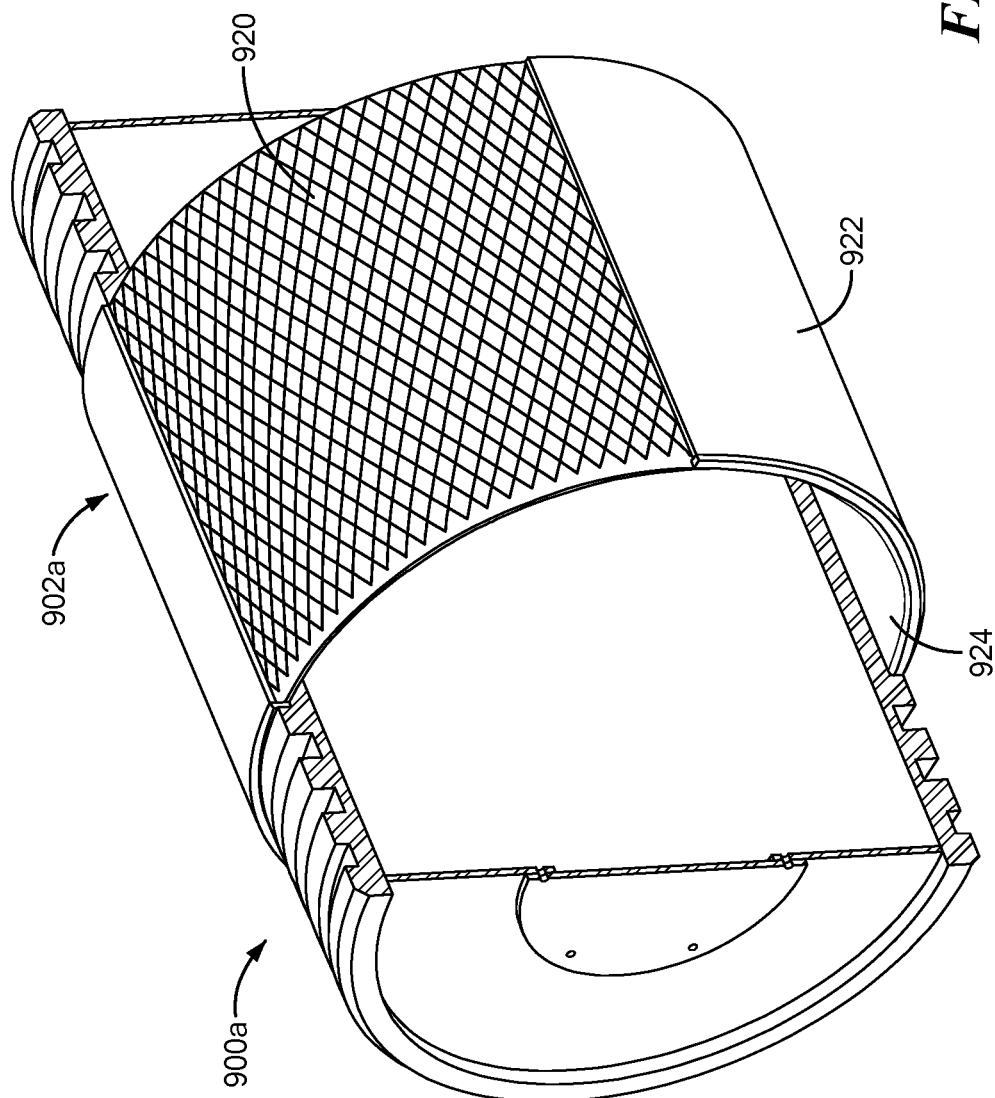

The compressible seal may incorporate a frame or armature to provide structure, aid in mounting the seal to the piston, and help maintain the seal shape during piston operation. As shown in FIGS. 9B and 9C, piston 900a includes seal 902a which incorporates a support frame or armature 920 that lends a degree of structure to the compressible seal assembly, aiding in the stable attachment of the seal 902a to the piston 900a. This armature may consist of a metal or composite material formed into a rolled cylinder with regular openings (e.g. a mesh stainless steel sheet) or other features to allow the compliant seal material to be attached to both the inner and outer surfaces of the armature. The felt material, e.g. Kevlar felt material, may be placed on both the interior, felt material 922, and exterior sides, felt material 924, of the armature, and attached together to make the overall compressible seal 902a. Felt material 922 and 924 may be manually stitched onto armature 920 using Kevlar stitching, rivets or other suitable methods. Alternatively the frame may be formed of a metal sheet with punched holes, or a carbon mesh could be used.

As an example, when using a vessel with an ID of about 34"; the seal 902a may have a thickness of roughly 1.5"-2" when uncompressed; and it might be compressed to 25-75% of its original thickness depending on pipe tolerances and variations, and operating conditions. The expanded/mesh metal sheet of armature 920 may be in the range of 0.05" to 0.125" thick.

The floating separator piston travels back and forth along the storage pipeline as the thermal storage vessel is charged or discharged, with a system of piston seals that limits fluid blow past the piston-pipeline wall gap caused by pressure and thermal gradients experienced by the system. With the piston and pipeline oriented in a substantially horizontal orientation, the effects of gravity on the piston and its piston seal system are asymmetric and can result in uneven forces and wear over time, as well as increased seal friction at the lower seal area, and increased leakage at the upper seal area. To mitigate this effect, the piston can preferably be designed to achieve a substantially neutral buoyancy when fully submersed in the liquid working fluid. While the buoyancy would vary somewhat as fluid and piston temperatures fluctuate during operation, a substantially neutral buoyancy state for the piston offers a definite operating advantage.

This neutral buoyancy state for the floating separator piston 900 can be achieved in a number of ways. A void or internal chamber encompassing either the entire or a portion of the piston interior region 908 can be introduced into the piston structure that is isolated from the system working fluid, variously evacuated to create a vacuum; filled with air or a relatively nonreactive gas such as nitrogen; filled with a light material such as foamed glass or metal; or one or more buoyant objects such as a gas filled enclosure(s) introduced to the interior of the piston The level of buoyancy to be introduced into the piston would be designed to roughly offset the gravitation forces on the piston, with a goal of reducing the gravitation loads on the piston and its seals to less than 20% of loads on a piston with no buoyancy. The piston 900 may further include insulating materials, thermal breaks, or sealed chambers within interior region 908 to decrease axial thermal conduction through the piston.

Pressure relief valves can be incorporated into the piston 900 to limit the maximum pressure differential across the piston. This provides additional system safety by limiting the net moving force on the piston during system fault conditions such as control anomalies, and also prevent pressure buildup and rapid piston movement if the piston gets stuck in the pipeline. Features can be built into the piston to allow easier extraction from the pipeline if the piston becomes lodged during operations, or to retrieve the piston during routine service intervals. Passive or active instrumentation can be incorporated into the piston to monitor leakage bypass to determine seal performance, and to monitor the location of each piston in the overall system.

One or more sealing rings, 904 may be included near each end of the piston and may be made of any suitable metal, polymer, or composite material formed into a ring and mounted in a retaining slot or feature in the piston body. The piston rings 904 provide a seal against axial fluid bypass through the piston-pipeline interface. FIG. 10 shows two exemplary segmented piston ring designs 1002 and 1004, which may be used in accordance with embodiments of the present disclosure. The piston rings may be retained in circumferential slots in the piston body. The rings 1002 and 1004, are designed to expand against the inner surface of the pipe and provide a sealing function to limit fluid bypass around the piston between the hot and cold pipe regions. It is to be understood that either one or both ring designs 1002 and 1004 could be used as sealing rings 904. In addition, any other sealing ring known to a person having skill in the art may be used.

The sealing rings may be formed of a plurality of arc segments, such as segments 1002a-1002c of sealing ring 1002 and segments 1004a and 1004b of sealing ring 1004. The segments are connected end to end using, for example, an articulating joint, such as joints 1006a and 1006b for sealing ring 1002 and joint 1008a for sealing ring 1004. Together the segments form a complete ring that is mounted in a corresponding piston ring groove feature on the piston. This segmented ring design carries a number of advantages:

(1) The piston and corresponding pipeline inner diameter are quite large, typically on the order of 1 m in diameter or larger. Fabrication of a one-piece piston ring of this diameter is expensive and difficult but may be a viable option in certain circumstances. The arc segments of a multi-piece ring are smaller and easier to fabricate using a variety of methods, including machining, roll forming, and particularly 3-D printing methods, and are therefore generally preferred to the single-piece ring.

(2) Clearance can be designed into each articulating joint between the ring sections, providing a controlled amount of compliance in the completed ring to adapt to variations in the matching pipeline diameter and ovality.

An exemplary sealing ring may be divided into eight sections, but the ring could alternately be configured with any practical number of sections based on the capabilities and associated cost of the ring material and the fabrication method used. Dividing the sealing rings into eight sections for a one (1) meter nominal ring creates sections that can readily be fabricated using existing 3D printing methods.

The ring sections can be fabricated using a variety of materials and using a variety of fabrication methods. 3D printing can be used to create ring sections out of a thermoplastic polymer, such as Polyether ether ketone or Polyether ketone. Alternatively, the ring sections could be formed from steel, stainless steel, Inconel, and a variety of bronze alloys depending on the pressure and temperature requirements of the specific application.

The ring sections can be designed to incorporate spring elements, such as spring element 1010 mounted in a recess of segment 1002b of sealing ring 1002, to provide a controlled prevailing pressure against the pipe's inner wall, allowing effective sealing while accommodating pipeline ID variations and seal wear over time. In one embodiment, the spring element used to position the ring against the pipeline wall can be a single piece linear wave spring, formed into a circle and retained in a matching recesses on the inner circumference of each ring segment. In another embodiment, each ring segment has its own spring element, with features incorporated into each ring section to retain its respective spring element. The spring elements may be any suitable type, including wave, coil, leaf or zig-zag. While not shown, the various types of spring elements may be incorporated into recesses formed in the inner diameter of sealing ring 1004.

While a sealing ring, including a plurality of segments is described here, it is expressly contemplated that the sealing ring 904 may be formed as a one-piece split ring that can be sprung out to mount in a matching slot in the piston. The one-piece ring may then contract to stay retained in the piston slot, similar to conventional internal combustion engine piston rings. The one piece sealing ring formed of steel may be designed to have a slightly larger diameter than the inner diameter of the recess in the piston surface so that it may be retained in the recess, and it provides a prevailing spring force against the inner surface of the pipe once the piston is installed in the interior of the pipe.

The piston 900 may also include one or more rider rings 906. The rider rings 906 may be located at each end of the piston 900, outside of the sealing rings. The primary function of the rider rings 906 is to center and locate the piston within the pipe bore and to take the primary gravity and other asymmetric loads on the piston to reduce wear of the sealing rings. The rider rings 906, therefore, protect the sealing rings from excessive forces and wear. Exemplarily, the rider rings 906 may be fabricated from a Ni—Al-Bronze alloy.

Because the rider rings are not designed for a sealing function, but as a locating and wear pad element, alternatively multiple rider pads may be installed on each end of the piston to locate it within the pipe and provide the same functions as the rider rings. The rider pads can readily be fabricated from stock shapes with minimal material waste and low cost. FIG. 12 shows another piston design 1200 in accordance with an embodiment of the present disclosure which utilizes rider pads. The piston 1200 includes segmented sealing rings 1204 and a compressible low porosity seal 1202 in the center region of the piston. The seal 1202 may be constructed similar to the seal 902 of piston 900 described above. Further, the segmented rings 1204 may be constructed similar to the sealing rings 904 of piston 900. Instead of using rider rings 906 of FIG. 9A, rider pads 1206 may be included around the circumference of each end of piston 1200 to perform the same function as the rider rings.

FIG. 13 shows another piston design 1300 in accordance with an aspect of the present disclosure. Piston 1300 includes a compressible, low porosity member 1302 made of glass felt, which acts as the seal between the hot and cold parts of the working fluid similar to the comparable compressible members of FIGS. 9 and 12. However, piston 1300 includes spring-loaded, wedge-shaped members 1304 and 1305, each mounted by means of a hinge or pivot distally to the piston, and located about the circumference of each piston end that expand to fill in the gap between the piston 1300 and the interior wall 1306 in which the piston is disposed. The wedge shaped members 1304 and 1305 pivot individually to conform to the gap between the piston 1300 and the pipe 1306. The piston 1300 also has spring-loaded rollers 1308 and 1310 which connect with the wall of the pipe 1306 and perform the same function as do the rider rings and rider pads of the above-described piston embodiments.

FIG. 14 shows a piston 1400 in accordance with another embodiment of the present invention. Piston 1400 also has spring-loaded rollers 1404 and 1405, which perform the same function as do the rider rings and rider pads of the above-described piston embodiments. Piston 1400 also includes a mesh screen 1402, which acts as the compressible, low porosity member, and low permeability material. The rollers 1404 and 1405 are spring-loaded and connect with the wall of the pipe 1406. The metallic mesh 1402 acts as a separator between the hot and cold sides of the working fluid.

FIG. 15 shows a piston 1500 in accordance with yet another embodiment of the present invention. The piston 1500 has a magnetic core (not shown) surrounded by compressible ferrofluid material 1502. The ferrofluid acts as a separator between the hot and cold sides of the working fluid. Although not shown, spring-loaded rollers, rider rings or rider pads could be utilized with this embodiment.

In any of the piston designs described above, spring loader rollers, rider pads and/or rider rings may be utilized. In addition, any of the floating piston designs may be configured to move within the storage "pipe" passively in response to small pressure differential between the ends of the piston (i.e. 5-10 psi) and fluid flow caused by pumping the fluid between the opposing hot and cold sections. In addition, in other embodiments, the piston itself may be equipped with a drive mechanism to travel under its own power in an axial direction along the interior of the pipe, effectively acting as a positive displacement pump to drive the fluid between the opposing hot and cold sections.

The piston designs may incorporate insulation properties to minimize heat transfer through the piston between the hot and cold sides of the thermal storage system. They may include a system of seals to minimize leakage of the working fluid around the piston from between the hot and cold sides of the thermal storage system. In addition, the piston may be designed with features to keep the surfaces of the pipeline operating region clear of deposits and accumulated buildup of the system's operating life. These features could replicate functionality found in O&G pipeline "pigs" used to periodically clean and inspect pipeline systems.

Overall Control System

The control system for a renewable energy storage and dispatch system described herein may consist of, for example, an industrial PLC, remote I/O, and supporting components to provide safety and control functionality for the thermal storage system, and to interface with the controls of the heat source (e.g. a CSP solar system) and of the thermal load (e.g. ORC heat engine system) to create an overall control system for generation, storage, and use of thermal energy.

The control system controls overall operation under all conditions, managing transitions between the defined operating states for the system. A simplified state diagram 1600 for the control system is shown in FIG. 16. The control system may, for example, be used to control the renewable energy storage and dispatch system 600 shown and described above with reference to FIG. 6. Of course, this control system could readily be adapted to operate any of the thermal storage system embodiments described herein.

Within each operating state of state diagram 1600, a defined sequence of conditional operations is carried out by the system controller which are specific to that operating state. Data from temperature, pressure, flow, level, and potentially other sensors are read and recorded, and the system pumps, valves and potentially other output devices are commanded to respond to start, stop, and manage the charge and discharge of the storage system. In addition, the storage control system communicates with both the thermal energy sources (solar, geothermal, biowaste etc.) and the thermal loads (ORC heat engine, industrial heat, etc.) subsystems to maintain a complete dispatchable and controllable energy system.

In state 1 (off state), shown in block 1602 of state diagram 1600, the CSP solar field is in an inactive state and the ORC heat engine is turned off. Additionally, in this state a no system fault detected signal is received. In state 2 (Warm up), block 1604, the CSP solar field is activated, the ORC heat engine is maintained in the off state, and the CSP solar field brings the working fluid of the storage system up to its normal operating temperature. In state 3 (Normal daytime) block 1606, the CSP solar field is active, the ORC heat engine is online and the storage system is charged by the CSP solar field, and the system waits for a discharge demand from the ORC heat engine. The normal daytime mode continues with charging and discharging cycles as required. In state 4 (Normal night) block 1608, the solar field is inactive and the ORC heat engine is active. The transition to Normal night would occur after the thermal storage system is charged by the CSP solar field one last time Normal daytime state.

When operating either in the Normal daytime state or the Normal night state, if a service shutdown is activated, the system transitions to state 5 (Service shutdown) block 1610, where the CSP solar system and the ORC heat engine are inactivated, but the system controls remain active. When operating either in Normal daytime state or Normal night state, if a fault shutdown is activated, the system transitions to state 6 (Fault shutdown) block 1612, where the CSP solar system and the ORC heat engine are inactivated, and the system controls are inactivated until a fault clearance signal is received.

A simplified example of pump and control valve actions matrix 1700, FIG. 17, is shown for several system states of state diagram 1600 of FIG. 16. Matrix 1700 illustrates example controller output commands for controlling various pumps P1-P3 and control valves CV1-CV7 for the renewable energy storage and dispatch system 600 of FIG. 6 during the Start-up, Day, and Night states.

FIG. 18 shows an example of control system flow diagram 1800 for the defined Normal daytime operational state (state 3) block 1606 of the state diagram of FIG. 16. In step 1802, it is determined if the ORC heat engine has been dispatched to supply electricity to its loads. If the heat engine has been dispatched, the system proceeds to step 1804 to determine if the current output from the CSP solar system exceeds the ORC heat engine demand. If the heat engine has not been dispatched at step 1802, the current output from the CSP solar system is directed to the thermal storage system to charge the system at step 1806. Referring to line 1710 of matrix 1700, FIG. 17, and system 600, FIG. 6, in this step the CSP solar system 620 is on, pump 606 (P1) is activated, control valves 619*b* (CV2) and 619*d* (CV3) are open, and control valves 619*c* (CV4) and 619*e* (CV5) are closed.

Referring again to step 1804, if the current output from the CSP solar system is determined to exceed the ORC heat engine demand, at step 1808 the demanded amount of thermal output from the CSP solar system is provided to the ORC heat engine and the remaining/excess thermal output is directed to the thermal storage system to charge the system. Referring to line 1720 of matrix 1700, in this step, the CSP solar system 620 and the ORC heat engine 640 are on, pumps 606 (P1) and 618 (P2) are activated, and control valves 619*b* (CV2), 619*d* (CV3), 619*c* (CV4) and 619*e* (CV5) are open.

If at step 1804, the current output from the CSP solar system is determined to not meet the ORC heat engine demand, the system proceeds to step 1810 where it is determined if the thermal storage system has enough thermal energy stored to meet the CSP solar output shortfall. If at step 1810 it is determined that the storage system has enough stored thermal energy, in step 1812, the thermal storage system supplies enough thermal energy in combination with the CSP solar system to support the demand of the ORC heat engine. Referring to line 1730 of matrix 1700, in this step, the CSP solar system 620 and the ORC heat engine 640 are on, pumps 606 (P1) and 618 (P2) are activated, and control valves 619*b* (CV2), 619*d* (CV3), 619*c* (CV4) and 619*e* (CV5) are open.

If at step 1810 it is instead determined that the storage system does not have enough stored thermal energy, in step 1814, the thermal storage system is charged by the CSP solar system and does not supply to the ORC heat engine. Referring to line 1740 of matrix 1700, in this step, the CSP solar system 620 is on and the ORC heat engine 640 is off, pumps 606 (P1) and 618 (P2) are activated, and control valves 619*b* (CV2) and 619*d* (CV3) are open and control valves 619*c* (CV4) and 619*e* (CV5) are closed.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A floating separator piston configured to be disposed in a vessel of a thermal energy storage system to separate a hot working fluid from a cold working fluid, the floating separator piston comprising:
   a piston body having a first end, a second end, and a central region; wherein when the floating separator piston is disposed in the vessel, the first end is in communication with the hot working fluid and the second end is in communication with the cold working fluid;
   a compressible member which is disposed in the central region of the piston body and which is configured to engage with an inner surface of the vessel when the floating separator piston is disposed in the vessel; and
   wherein the compressible member has a porosity level that results in a thermal loss due to leakage of the hot working fluid at the first end of the floating separator piston to the cold working fluid at the second end of the floating separator piston of no more than 5% of an overall thermal loss in the thermal energy storage system.

2. The floating separator piston of claim 1, wherein the piston body is cylindrical in shape and includes an outer surface having a first recess formed therein about a circumference of the piston body; wherein the first recess is formed in the central region and extends along a portion of a length of the piston body.

3. The floating separator piston of claim 2 wherein the compressible member is disposed in the first recess and extends along a length of the first recess and about the circumference of the piston body.

4. The floating separator piston of claim 3, wherein the length of the first recess is 50% to 90% of the length of the piston body.

5. The floating separator piston of claim 1, wherein the compressible member is compressible to a thickness of between 25-75% of its original thickness.

6. The floating separator piston of claim 1, wherein the compressible member includes one or more of synthetic fiber or glass.

7. The floating separator piston of claim 1, wherein the compressible member comprises a felt matrix material made of one or more of synthetic fiber or glass.

8. The floating separator piston of claim 3, wherein the compressible member engages with the inner surface of the vessel with an amount of friction that allows movement of the piston in the vessel with a pressure difference of not more than 10 psi between the first end of the piston to the second end of the piston.

9. The floating separator piston of claim 8, wherein the inner surface of the vessel has a variable roughness.

10. The floating separator piston of claim 1 wherein the compressible member includes a support frame comprising one of a metal or a composite material.

11. The floating separator piston of claim 1, wherein an outer diameter of the piston body is at least 0.75 meters.

12. The floating separator piston of claim 1, wherein the piston body is symmetrical.

13. The floating separator piston of claim 1, wherein the floating piston has a neutral buoyancy state when disposed in the working fluid.

14. The floating separator piston of claim 13, wherein the piston body includes an internal chamber and wherein the internal chamber is evacuated to create a vacuum or it is includes one or more of air, a nonreactive gas, a foamed glass or a metal.

15. The floating separator piston of claim 14, wherein the internal chamber includes one or more of insulating materials, thermal breaks, and sealed chambers to decrease axial thermal conduction through the piston body.

16. The floating separator piston of claim 1, further including a first piston ring disposed in a first circumferential slot located between the first end and the central region of the piston body and a second piston ring disposed in a second circumferential slot located between the second end and the central region of the piston body; and further including a third piston ring disposed in a third circumferential slot located between the first circumferential slot and the central region of the piston body and a fourth piston ring disposed in a fourth circumferential slot located between the second circumferential slot and the central region of the piston body.

17. The floating separator piston of claim 16, wherein the first piston ring, the second piston ring, the third piston ring, and forth piston ring each have an outside diameter larger than an inside diameter of the vessel of the thermal energy storage system, and wherein each is compliant in a radial direction to provide a force against an inside surface of the vessel.

18. The floating separator piston of claim 16, wherein at least one of the first piston ring, the second piston ring, the third piston ring, and the fourth piston ring is formed of a plurality of arc segments; and wherein the plurality of arc segments are interconnected with an articulating joint.

19. The floating separator piston of claim 18, wherein each arc segment is formed of one of a thermoplastic material, a metal, or a metal alloy.

20. The floating separator piston of claim 18, wherein each arc segment includes a recess on an inner surface to receive a spring element.

21. The floating separator piston of claim 20, wherein the spring element is wave spring.

22. The floating separator piston of claim 20, wherein the spring element is one of a single spring element spanning the circumference of the at least one first or second piston ring or a plurality of spring members one contained in the recess of each arc segment.

23. The floating separator piston of claim 16, further including a first rider ring disposed in a first circumferential rider ring slot located between the first end and the first piston ring and a second rider ring disposed in a circumferential rider ring slot located between the second end and the second piston ring.

24. The floating separator piston of claim 23, the first rider ring and the second rider ring comprise a Ni—Al-Bronze alloy.

25. The floating separator piston of claim 16, further including a first set of rider pads disposed circumferentially about piston body between first end and the first piston ring and a second set of rider pads disposed circumferentially about the piston body between the second end and the second piston ring.

26. The floating separator piston of claim 25, the first set of rider pads and the second set of rider pads comprise a Ni—Al-Bronze alloy.

27. A floating separator piston configured to be disposed in a vessel of a thermal energy storage system to separate a hot working fluid from a cold working fluid, the floating separator piston comprising:
   a piston body having a first end, a second end, and a central region; wherein when the floating separator piston is disposed in the vessel, the first end is in communication with the hot working fluid and the second end is in communication with the cold working fluid;
   a compressible member which is disposed in the central region of the piston body and which is configured to engage with an inner surface of the vessel when the floating separator piston is disposed in the vessel;
   wherein the compressible member has a porosity level that results in a thermal loss due to leakage of the hot working fluid from the first end of the piston to the cold working fluid at the second end of the piston of no more than 5% of an overall thermal loss in a thermal energy storage system using the floating separator piston; and
   wherein the compressible member engages with the inner surface of the vessel with an amount of friction that allows movement of the piston in the vessel with a pressure difference of not more than 10 psi between the first end of the floating separator piston to the second end of the floating separator piston.

\* \* \* \* \*